(12) United States Patent
Kondou et al.

(10) Patent No.: US 7,603,608 B2
(45) Date of Patent: Oct. 13, 2009

(54) DATA PROCESSING METHOD, DATA RECORDING APPARATUS AND DATA TRANSMISSION APPARATUS

(75) Inventors: Keitarou Kondou, Tokyo (JP); Makoto Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 543 days.

(21) Appl. No.: 11/265,580

(22) Filed: Nov. 2, 2005

(65) Prior Publication Data

US 2006/0107173 A1    May 18, 2006

(30) Foreign Application Priority Data

Nov. 17, 2004    (JP) .............................. 2004-333692

(51) Int. Cl.
*H03M 13/00*    (2006.01)

(52) U.S. Cl. .................. 714/752; 714/756; 714/784

(58) Field of Classification Search .................. 714/752, 714/756, 784
See application file for complete search history.

(56) References Cited

U.S. PATENT DOCUMENTS 6,016,182 A * 1/2000 Ohashi et al. ................. 352/37

* cited by examiner

*Primary Examiner*—Guy J Lamarre
(74) *Attorney, Agent, or Firm*—Robert J. Depke; Rockey, Depke & Lyons, LLC

(57) ABSTRACT

Systems and methods for ending, storing and transmitting data generate error correcting code words for data that is provided for each of a plurality of channels. The error correcting code words include data from each of the plurality of channels and the resultant data is rearranged into a plurality of data blocks such that a loss of the rearranged physically adjacent data block reduces an amount of data lost from a common error correcting code word.

8 Claims, 33 Drawing Sheets

| | | | | | | | |
|---|---|---|---|---|---|---|---|
| | 511 | 63 | 127 | 191 | 255 | 319 | 383 | 447 |
| 446 | 510 | 62 | 126 | 190 | 254 | 318 | 382 |

⋮

| | 8 | 72 | 136 | 200 | 264 | 328 | 392 | 456 |
| 455 | 7 | 71 | 135 | 199 | 263 | 327 | 391 |
| 390 | 454 | 6 | 70 | 134 | 198 | 262 | 326 |
| 325 | 389 | 453 | 5 | 69 | 133 | 197 | 261 |
| 260 | 324 | 388 | 452 | 4 | 68 | 132 | 196 |
| 195 | 259 | 323 | 387 | 451 | 3 | 67 | 131 |
| 130 | 194 | 258 | 322 | 386 | 450 | 2 | 66 |
| 65 | 129 | 193 | 257 | 321 | 385 | 449 | 1 |
| 0 | 64 | 128 | 192 | 256 | 320 | 384 | 448 |
| track0 | track1 | track2 | track3 | track4 | track5 | track6 | track7 |

| | track0 | track1 | track2 | track3 | track4 | track5 | track6 | track7 |
|---|---|---|---|---|---|---|---|---|
| A | 0 | 64 | 128 | 192 | 256 | 320 | 384 | 448 |
| | 65 | 129 | 193 | 257 | 321 | 385 | 449 | 1 |
| | 130 | 194 | 258 | 322 | 386 | 450 | 2 | 66 |
| | 195 | 259 | 323 | 387 | 451 | 3 | 67 | 131 |
| | 260 | 324 | 388 | 452 | 4 | 68 | 132 | 196 |
| | 325 | 389 | 453 | 5 | 69 | 133 | 197 | 261 |
| | 390 | 454 | 6 | 70 | 134 | 198 | 262 | 326 |
| | 455 | 7 | 71 | 135 | 199 | 263 | 327 | 391 |

B

| 0 | 1 | 2 | 3 | 4 | 5 | 6 | 7 |
|---|---|---|---|---|---|---|---|
| 1 | 2 | 3 | 4 | 5 | 6 | 7 | 0 |
| 2 | 3 | 4 | 5 | 6 | 7 | 0 | 1 |
| 3 | 4 | 5 | 6 | 7 | 0 | 1 | 2 |
| 4 | 5 | 6 | 7 | 0 | 1 | 2 | 3 |
| 5 | 6 | 7 | 0 | 1 | 2 | 3 | 4 |
| 6 | 7 | 0 | 1 | 2 | 3 | 4 | 5 |
| 7 | 0 | 1 | 2 | 3 | 4 | 5 | 6 |

| 0 | 3 | 6 | 1 | 4 | 7 | 2 | 5 | 8 |
|---|---|---|---|---|---|---|---|---|
| 2 | 5 | 8 | 0 | 3 | 6 | 1 | 4 | 7 |
| 1 | 4 | 7 | 2 | 5 | 8 | 0 | 3 | 6 |
| 3 | 6 | 0 | 4 | 7 | 1 | 5 | 8 | 2 |
| 5 | 8 | 2 | 3 | 6 | 0 | 4 | 7 | 1 |
| 4 | 7 | 1 | 5 | 8 | 2 | 3 | 6 | 0 |
| 6 | 0 | 3 | 7 | 1 | 4 | 8 | 2 | 5 |
| 8 | 2 | 5 | 6 | 0 | 3 | 7 | 1 | 4 |
| 7 | 1 | 4 | 8 | 2 | 5 | 6 | 0 | 3 |

| | track0 | track1 | track2 | track3 | track4 | track5 | track6 | track7 |
|---|---|---|---|---|---|---|---|---|
| | 511 | 63 | 127 | 191 | 255 | 319 | 383 | 447 |
| | 446 | 510 | 62 | 126 | 190 | 254 | 318 | 382 |
| | ⋮ | ⋮ | ⋮ (ER) | ⋮ | ⋮ | ⋮ | ⋮ | ⋮ |
| | 455 | 8 | 72 | 136 | 200 | 264 | 328 | 392 | 456 |
| | 390 | 454 | 7 | 71 | 135 | 199 | 263 | 327 | 391 |
| | 325 | 389 | 453 | 6 | 70 | 134 | 198 | 262 | 326 |
| | 260 | 324 | 388 | 452 | 5 | 69 | 133 | 197 | 261 |
| | 195 | 259 | 323 | 387 | 451 | 4 | 68 | 132 | 196 |
| | 130 | 194 | 258 | 322 | 386 | 450 | 3 | 67 | 131 |
| | 65 | 129 | 193 | 257 | 321 | 385 | 449 | 2 | 66 |
| | 0 | 64 | 128 | 192 | 256 | 320 | 384 | 448 | 1 |

ER

| 0 | 3 | 6 | 1 | 4 | 7 | 2 | 5 | 8 |
|---|---|---|---|---|---|---|---|---|
| 2 | 5 | 8 | 0 | 3 | 6 | 1 | 4 | 7 |
| 1 | 4 | 7 | 2 | 5 | 8 | 0 | 3 | 6 |
| 3 | 6 | 0 | 4 | 7 | 1 | 5 | 8 | 2 |
| 5 | 8 | 2 | 3 | 6 | 0 | 4 | 7 | 1 |
| 4 | 7 | 1 | 5 | 8 | 2 | 3 | 6 | 0 |
| 6 | 0 | 3 | 7 | 1 | 4 | 8 | 2 | 5 |
| 8 | 2 | 5 | 6 | 0 | 3 | 7 | 1 | 4 |
| 7 | 1 | 4 | 8 | 2 | 5 | 6 | 0 | 3 |

FIG.7

|        | 0 | 1 | 2 | 3 | 4 | 5 | 6 | 7 | 8 | 9 | a | b | c | d | e | f |
|--------|---|---|---|---|---|---|---|---|---|---|---|---|---|---|---|---|
| track0 | 0 | 1 | 2 | 3 | 4 | 5 | 6 | 7 | 8 | 9 | a | b | c | d | e | f |
| track1 | c | d | e | f | 0 | 1 | 2 | 3 | 4 | 5 | 6 | 7 | 8 | 9 | a | b |
| track2 | 8 | 9 | a | b | c | d | e | f | 0 | 1 | 2 | 3 | 4 | 5 | 6 | 7 |
| track3 | 4 | 5 | 6 | 7 | 8 | 9 | a | b | c | d | e | f | 0 | 1 | 2 | 3 |
| track4 | f | 0 | 1 | 2 | 3 | 4 | 5 | 6 | 7 | 8 | 9 | a | b | c | d | e |
| track5 | b | c | d | e | f | 0 | 1 | 2 | 3 | 4 | 5 | 6 | 7 | 8 | 9 | a |
| track6 | 7 | 8 | 9 | a | b | c | d | e | f | 0 | 1 | 2 | 3 | 4 | 5 | 6 |
| track7 | 3 | 4 | 5 | 6 | 7 | 8 | 9 | a | b | c | d | e | f | 0 | 1 | 2 |
| track8 | e | f | 0 | 1 | 2 | 3 | 4 | 5 | 6 | 7 | 8 | 9 | a | b | c | d |
| track9 | a | b | c | d | e | f | 0 | 1 | 2 | 3 | 4 | 5 | 6 | 7 | 8 | 9 |
| track10 | 6 | 7 | 8 | 9 | a | b | c | d | e | f | 0 | 1 | 2 | 3 | 4 | 5 |
| track11 | 2 | 3 | 4 | 5 | 6 | 7 | 8 | 9 | a | b | c | d | e | f | 0 | 1 |
| track12 | d | e | f | 0 | 1 | 2 | 3 | 4 | 5 | 6 | 7 | 8 | 9 | a | b | c |
| track13 | 9 | a | b | c | d | e | f | 0 | 1 | 2 | 3 | 4 | 5 | 6 | 7 | 8 |
| track14 | 5 | 6 | 7 | 8 | 9 | a | b | c | d | e | f | 0 | 1 | 2 | 3 | 4 |
| track15 | 1 | 2 | 3 | 4 | 5 | 6 | 7 | 8 | 9 | a | b | c | d | e | f | 0 |

FIG. 10

| | | | | | | | | | | | | | | | | |
|---|---|---|---|---|---|---|---|---|---|---|---|---|---|---|---|---|
| track0 | 0 | 1 | 2 | 3 | 4 | 5 | 6 | 7 | 8 | 9 | a | b | c | d | e | f |
| track1 | 1 | 2 | 3 | 4 | 5 | 6 | 7 | 8 | 9 | a | b | c | d | e | f | 0 |
| track2 | 2 | 3 | 4 | 5 | 6 | 7 | 8 | 9 | a | b | c | d | e | f | 0 | 1 |
| track3 | 3 | 4 | 5 | 6 | 7 | 8 | 9 | a | b | c | d | e | f | 0 | 1 | 2 |
| track4 | 4 | 5 | 6 | 7 | 8 | 9 | a | b | c | d | e | f | 0 | 1 | 2 | 3 |
| track5 | 5 | 6 | 7 | 8 | 9 | a | b | c | d | e | f | 0 | 1 | 2 | 3 | 4 |
| track6 | 6 | 7 | 8 | 9 | a | b | c | d | e | f | 0 | 1 | 2 | 3 | 4 | 5 |
| track7 | 7 | 8 | 9 | a | b | c | d | e | f | 0 | 1 | 2 | 3 | 4 | 5 | 6 |
| track8 | 8 | 9 | a | b | c | d | e | f | 0 | 1 | 2 | 3 | 4 | 5 | 6 | 7 |
| track9 | 9 | a | b | c | d | e | f | 0 | 1 | 2 | 3 | 4 | 5 | 6 | 7 | 8 |
| track10 | a | b | c | d | e | f | 0 | 1 | 2 | 3 | 4 | 5 | 6 | 7 | 8 | 9 |
| track11 | b | c | d | e | f | 0 | 1 | 2 | 3 | 4 | 5 | 6 | 7 | 8 | 9 | a |
| track12 | dc | d | e | f | 0 | 1 | 2 | 3 | 4 | 5 | 6 | 7 | 8 | 9 | a | b |
| track13 | d | e | f | 0 | 1 | 2 | 3 | 4 | 5 | 6 | 7 | 8 | 9 | a | b | c |
| track14 | e | f | 0 | 1 | 2 | 3 | 4 | 5 | 6 | 7 | 8 | 9 | a | b | c | d |
| track15 | f | 0 | 1 | 2 | 3 | 4 | 5 | 6 | 7 | 8 | 9 | a | b | c | d | e |

FIG. 1 1

| | | | | | | | | | | | | | | | | |
|---|---|---|---|---|---|---|---|---|---|---|---|---|---|---|---|---|
| track0  | 0 | 1 | 2 | 3 | 4 | 5 | 6 | 7 | 8 | 9 | a | b | c | d | e | f |
| track1  | 8 | 9 | a | b | c | d | e | f | 0 | 1 | 2 | 3 | 4 | 5 | 6 | 7 |
| track2  | c | d | e | f | 8 | 9 | a | b | 4 | 5 | 6 | 7 | 0 | 1 | 2 | 3 |
| track3  | 4 | 5 | 6 | 7 | 0 | 1 | 2 | 3 | c | d | e | f | 8 | 9 | a | b |
| track4  | 2 | 3 | 0 | 1 | 6 | 7 | 4 | 5 | a | b | 8 | 9 | e | f | c | d |
| track5  | a | b | 8 | 9 | e | f | c | d | 2 | 3 | 0 | 1 | 6 | 7 | 4 | 5 |
| track6  | e | f | c | d | a | b | 8 | 9 | 6 | 7 | 4 | 5 | 2 | 3 | 0 | 1 |
| track7  | 6 | 7 | 4 | 5 | 2 | 3 | 0 | 1 | e | f | c | d | a | b | 8 | 9 |
| track8  | 3 | 2 | 1 | 0 | 7 | 6 | 5 | 4 | b | a | 9 | 8 | f | e | d | c |
| track9  | b | a | 9 | 8 | f | e | d | c | 3 | 2 | 1 | 0 | 7 | 6 | 5 | 4 |
| track10 | f | e | d | c | b | a | 9 | 8 | 7 | 6 | 5 | 4 | 3 | 2 | 1 | 0 |
| track11 | 7 | 6 | 5 | 4 | 3 | 2 | 1 | 0 | f | e | d | c | b | a | 9 | 8 |
| track12 | 1 | 0 | 3 | 2 | 5 | 4 | 7 | 6 | 9 | 8 | b | a | d | c | f | e |
| track13 | 9 | 8 | b | a | d | c | f | e | 1 | 0 | 3 | 2 | 5 | 4 | 7 | 6 |
| track14 | d | c | f | e | 9 | 8 | b | a | 5 | 4 | 7 | 6 | 1 | 0 | 3 | 2 |
| track15 | 5 | 4 | 7 | 6 | 1 | 0 | 3 | 2 | d | c | f | e | 9 | 8 | b | a |

| | 0 | 1 | 2 | 3 | 4 | 5 | 6 | 7 |
|---|---|---|---|---|---|---|---|---|
| track0 | 0 | 129 | 258 | 387 | | | | |
| track1 | | | | | 4 | 133 | 262 | 391 |
| track2 | | | | | | | | |
| track3 | | | | | | | | |
| track4 | 1 | 130 | 259 | 388 | | | | |
| track5 | | | | | 5 | 134 | 263 | |
| track6 | | | | | | | | |
| track7 | 384 | | | | | | | |
| track8 | | | | 2 | 131 | 260 | 389 | |
| track9 | | | | | | | 6 | 135 |
| track10 | | | | | | | | |
| track11 | 256 | 385 | | | | | | |
| track12 | | | | | 132 | 261 | 390 | |
| track13 | | | | 3 | | | | 7 |
| track14 | | | | | | | | |
| track15 | 128 | 257 | 386 | | | | | |

Writing direction →

| 126 | 127 | | | | 382 | 511 | | | 254 | 383 | | | 126 | 255 | | | | 127 |
|---|---|---|---|---|---|---|---|---|---|---|---|---|---|---|---|---|---|---|
| | | | | | | | | | | | | | | | | 510 | | |

| 0 | 1 | 2 | 3 |
|---|---|---|---|
| 2 | 3 | 0 | 1 |
| 3 | 0 | 1 | 2 |
| 1 | 2 | 3 | 0 |

FIG.25

| 0 | 1 | 2 | 3 | 4 | 5 | 6 | 7 | 8 |
|---|---|---|---|---|---|---|---|---|
| 6 | 7 | 8 | 0 | 1 | 2 | 3 | 4 | 5 |
| 3 | 4 | 5 | 6 | 7 | 8 | 0 | 1 | 2 |
| 8 | 0 | 1 | 2 | 3 | 4 | 5 | 6 | 7 |
| 5 | 6 | 7 | 8 | 0 | 1 | 2 | 3 | 4 |
| 2 | 3 | 4 | 5 | 6 | 7 | 8 | 0 | 1 |
| 7 | 8 | 0 | 1 | 2 | 3 | 4 | 5 | 6 |
| 4 | 5 | 6 | 7 | 8 | 0 | 1 | 2 | 3 |
| 1 | 2 | 3 | 4 | 5 | 6 | 7 | 8 | 0 |

FIG.26

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 20 | 21 | 22 | 23 | 24 | 0 | 1 | 2 | 3 | 4 | 5 | 6 | 7 | 8 | 9 | 10 | 11 | 12 | 13 | 14 | 15 | 16 | 17 | 18 | 19 |
| 15 | 16 | 17 | 18 | 19 | 20 | 21 | 22 | 23 | 24 | 0 | 1 | 2 | 3 | 4 | 5 | 6 | 7 | 8 | 9 | 10 | 11 | 12 | 13 | 14 |
| 10 | 11 | 12 | 13 | 14 | 15 | 16 | 17 | 18 | 19 | 20 | 21 | 22 | 23 | 24 | 0 | 1 | 2 | 3 | 4 | 5 | 6 | 7 | 8 | 9 |
| 5 | 6 | 7 | 8 | 9 | 10 | 11 | 12 | 13 | 14 | 15 | 16 | 17 | 18 | 19 | 20 | 21 | 22 | 23 | 24 | 0 | 1 | 2 | 3 | 4 |
| 24 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 19 | 20 | 21 | 22 | 23 | 24 | 0 | 1 | 2 | 3 | 4 | 5 | 6 | 7 | 8 | 9 | 10 | 11 | 12 | 13 | 14 | 15 | 16 | 17 | 18 |
| 14 | 15 | 16 | 17 | 18 | 19 | 20 | 21 | 22 | 23 | 24 | 0 | 1 | 2 | 3 | 4 | 5 | 6 | 7 | 8 | 9 | 10 | 11 | 12 | 13 |
| 9 | 10 | 11 | 12 | 13 | 14 | 15 | 16 | 17 | 18 | 19 | 20 | 21 | 22 | 23 | 24 | 0 | 1 | 2 | 3 | 4 | 5 | 6 | 7 | 8 |
| 4 | 5 | 6 | 7 | 8 | 9 | 10 | 11 | 12 | 13 | 14 | 15 | 16 | 17 | 18 | 19 | 20 | 21 | 22 | 23 | 24 | 0 | 1 | 2 | 3 |
| 23 | 24 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 18 | 19 | 20 | 21 | 22 | 23 | 24 | 0 | 1 | 2 | 3 | 4 | 5 | 6 | 7 | 8 | 9 | 10 | 11 | 12 | 13 | 14 | 15 | 16 | 17 |
| 13 | 14 | 15 | 16 | 17 | 18 | 19 | 20 | 21 | 22 | 23 | 24 | 0 | 1 | 2 | 3 | 4 | 5 | 6 | 7 | 8 | 9 | 10 | 11 | 12 |
| 8 | 9 | 10 | 11 | 12 | 13 | 14 | 15 | 16 | 17 | 18 | 19 | 20 | 21 | 22 | 23 | 24 | 0 | 1 | 2 | 3 | 4 | 5 | 6 | 7 |
| 3 | 4 | 5 | 6 | 7 | 8 | 9 | 10 | 11 | 12 | 13 | 14 | 15 | 16 | 17 | 18 | 19 | 20 | 21 | 22 | 23 | 24 | 0 | 1 | 2 |
| 22 | 23 | 24 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| 17 | 18 | 19 | 20 | 21 | 22 | 23 | 24 | 0 | 1 | 2 | 3 | 4 | 5 | 6 | 7 | 8 | 9 | 10 | 11 | 12 | 13 | 14 | 15 | 16 |
| 12 | 13 | 14 | 15 | 16 | 17 | 18 | 19 | 20 | 21 | 22 | 23 | 24 | 0 | 1 | 2 | 3 | 4 | 5 | 6 | 7 | 8 | 9 | 10 | 11 |
| 7 | 8 | 9 | 10 | 11 | 12 | 13 | 14 | 15 | 16 | 17 | 18 | 19 | 20 | 21 | 22 | 23 | 24 | 0 | 1 | 2 | 3 | 4 | 5 | 6 |
| 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 0 | 1 |
| 21 | 22 | 23 | 24 | 0 | 1 | 2 | 3 | 4 | 5 | 6 | 7 | 8 | 9 | 10 | 11 | 12 | 13 | 14 | 15 | 16 | 17 | 18 | 19 | 20 |
| 16 | 17 | 18 | 19 | 20 | 21 | 22 | 23 | 24 | 0 | 1 | 2 | 3 | 4 | 5 | 6 | 7 | 8 | 9 | 10 | 11 | 12 | 13 | 14 | 15 |
| 11 | 12 | 13 | 14 | 15 | 16 | 17 | 18 | 19 | 20 | 21 | 22 | 23 | 24 | 0 | 1 | 2 | 3 | 4 | 5 | 6 | 7 | 8 | 9 | 10 |
| 6 | 7 | 8 | 9 | 10 | 11 | 12 | 13 | 14 | 15 | 16 | 17 | 18 | 19 | 20 | 21 | 22 | 23 | 24 | 0 | 1 | 2 | 3 | 4 | 5 |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 0 |

DATA PROCESSING METHOD, DATA RECORDING APPARATUS AND DATA TRANSMISSION APPARATUS

CROSS REFERENCES TO RELATED APPLICATIONS

The present invention contains subject matter related to Japanese Patent Application JP 2004-333692 filed in the Japanese Patent Office on Nov. 17, 2004, the entire contents of which being incorporated herein by reference.

BACKGROUND OF THE INVENTION

1. Field of the Invention

This invention relates to a data processing method, a data recording apparatus and a data transmission apparatus. More particularly, the present invention relates to a data processing method, a data recording apparatus and a data transmission apparatus adapted to encode data by combining interleaving and error-correcting codes in order to efficiently correct burst errors that can take place in a region of a certain size across a plurality of tracks or a plurality of communication channels when recording digital data by means of a magnetic tape recording apparatus or an optical disc recording apparatus and transmitting digital data by means of a multi-input, multi-output (MIMO) transmission system or some other transmission system.

2. Description of the Related Art

When recording digital data on a plurality of recording tracks arranged in parallel (e.g., side by side) on a recording medium by means of a magnetic tape recording apparatus or an optical disc recording apparatus or transmitting digital data by means of a multi-input, multi-output (MIMO) transmission system, an error burst can take place and part of the recorded information or transmitted information can continuously turn out to be an error. Typical causes of error bursts include, for example, dirt on the recording medium and a faulty reproduction head or optical pickup when a magnetic tape recording apparatus or an optical disc recording apparatus is used and large external turbulence noises that temporarily arise on communication channels when a communication apparatus is used. Other major causes of error bursts that may involve recording apparatus or communication apparatus include reproduced or received signals that have stepped out of synchronism.

With one of the popular techniques that are employed to efficiently correct burst errors of signals, input data are coded by combining error-correcting codes and interleaving (shuffling). The size of error burst that can be corrected is determined by the code parameters and the interleaving method that are employed.

For example, RS product codes formed by combining two Reed Solomon (RS) codes are often used as error-correcting codes to be combined with interleaving in magnetic tape recording apparatus and optical disc recording apparatus. An RS code is a code defined on a Galois Field (GF) and expressed by means of parameters (n, k, d), where n represents the code word length, k represents the information word length and d represents the minimum distance between code words. It is characterized in that it can correct up to $(d-1)/2$ symbol errors in a code word. When information on missing input data is available, it is possible to correct up to $d-1$ symbols by means of a decoding process, which is referred to as missing correction.

FIG. 1 of the accompanying drawings illustrate the structure of a product code word formed by combining two RS codes of C1 $(n_1, k_1, d_1)$ and C2 $(n_2, k_2, d_2)$. The product code word is obtained typically by coding each of the columns $0, 1, \ldots, (k_1-1)$ by means of the C2 code for a total of $k_1 \times k_2$ input data (product code information words) $\{D_0, D_1, \ldots, D_{k1 \times k2-1}\}$, adding the parities of $n_2-k_2$ symbols, subsequently coding the data of each row by means of the C1 code and adding the C1 parities of $n_1-k_1$ symbols. When decoding the C1 code first for each row of the product code word, the data included in the C1 code word detected by error detection are treated as missing data and then it is possible to execute a process of missing correction by means of the C2 code. For example, if it is not possible to correct a plurality of C1 code words because of the errors that arises, it is possible to correct errors of up to $d_2-1$ C1 code words in the product code word because only the symbols included in the C1 code words that could not be corrected when decoding C2 in each column turn out to be errors.

Patent Document 1 (U.S. Pat. No. 6,539,514) describes a recording method that can be used when recording eight RS product code words on eight tracks of a recording medium, using C1 code words as so many data blocks.

The interleaving technique described in Patent Document 1 will be briefly described below. Assume that product codes are formed by using every 12,636 bytes, starting from the leading byte, out of the input data of 101,088 bytes by using RS codes of C1 (240, 234, 7) and C2 (64, 54, 11) on GF $(2^8)$. As a result, eight product code words (15,360 bytes) as shown in FIG. 2 are obtained. Then, numbers 0 through 511 are sequentially assigned to all the 512 C1 code words (240 bytes) that constitute the eight product code words. These C1 code words are arranged on eight tracks in a format as illustrated in FIG. 3 by interleaving. Note, however, any two adjacently located recording tracks in FIG. 3 may not necessarily be physically arranged side by side on the recording medium. In other words, other recording tracks may exist between any two adjacent ones of the recording tracks illustrated in FIG. 3. The hatched partitions in FIG. 3 are C1 code words that belong to the first product code word so that it will be appreciated that the C1 code words that belong to a same product code word arranged recurrently in a diagonal direction. With this arrangement, if a burst error arises, involving all given tracks, but the data on the remaining seven tracks can be read correctly, 56 C1 code words of each product code word are read correctly except the eight C1 code words on the track where the burst error arises so that the product code word can be correctly decoded by missing correction at the time of decoding C2 codes.

On the other hand, Latin squares are known as a pattern formed by arranging a total of L numbers from 0 to L−1 in an L×L square (L is a natural number not smaller than 2). In a Latin square, a same number does not appear twice or more than twice in a same row and in a same column.

With the interleaving technique of Patent Document 1, each product code word is made to repeat the leading 8×8 arrangement pattern and the arrangement pattern determine the format of interleaving. An 8×8 Latin square is obtained by taking out the 8×8 region (A in FIG. 4), sorting the C1 code words by means of the product code words to which the C1 code words belong and assigning numbers of 0 through 7 to the eight product code words (B in FIG. 4). Note that, in FIG. 4, the blocks of the C1 code words that belong to the first (0-th) product code word are hatched.

Non-Patent Document 1 (K. Kim and V. K. P. Kumar, "Perfect Latin Squares and Parallel Array Access", Computer Architecture, 1989, the 16th Annual International Symposium on 28 May-1 June, pp. 372-379, 1989) introduces an arrangement referred to as perfect Latin square as a special type of Latin square.

In a perfect Latin square, a same number does not appear in a same diagonal line in addition to the characteristic of an $M^2 \times M^2$ (M is a natural number not smaller than 2) square that a same number does not appear twice or more than twice on each row and each column and, if the square is divided into M×M regions as shown in FIG. 5, a same number does not appear in each of the regions produced by dividing the Latin square. FIG. 5 shows an example of a perfect 9×9 Latin square (M=3). Non-Patent Document 1 also describes a method of generating a perfect Latin square, using two M×M Latin squares that are orthogonal relative to each other. Thus, the probability of occurrence of errors that concentrate in a code word will be reduced when an error burst arises to spread two dimensionally by using such an arrangement for interleaving the original code words if compared with the interleaving technique described in the above-cited Patent Document 1.

SUMMARY OF THE INVENTION

Meanwhile, multi-channel arrangement of recording tracks and communication channels will be effective for realizing a recording rate and a transmission rate that give rise to a higher throughput in information recording apparatus and communication apparatus in the future. Now, the influence of an error burst that spreads two-dimensionally on a multi-rack recording system adapted to use a plurality of recording tracks that are arranged in parallel on a recording medium will be discussed below as an example.

Assume that a coded data is divided into minimum recording units (data blocks) having a predetermined length for recording or transmission. In the instance of FIG. 2, a C1 code word (240 bytes) is defined as a data block.

Also assume that the interleaving technique disclosed in the above-cited Patent Document 1 is used in a manner as illustrated in FIG. 6 that is similar to FIG. 3. Then, if region ER of the size of 3×3 including three data blocks (of a C1 code word) over three tracks that is enclosed by emphasized lines in FIG. 6 falls into error, a code word (product code word) that can be an error is found in three data blocks. In the instance of FIG. 6, the hatched three data blocks (C1 code word) in the square of emphasized lines that belong to the 0-th product code word are error blocks.

If, on the other hand, the interleaving technique described in the above-cited Non-Patent Document 1 is used, the error correcting capability for errors that spread two-dimensionally is enhanced if compared with the technique of Patent Document 1 but it is not satisfactory. For example, in FIG. 7 that shows a perfect Latin square of 9×9 same as the one illustrated in FIG. 5, the region ER of the size of 2×3 enclosed by emphasized lines, which is smaller than the size of 3×3, includes two 0s so that, if this region falls into error, there is a code word (product code word) having two error data blocks. Additionally, the technique of Non-Patent Document 1 entails a problem that the number of transmission channels that can be used with the technique is limited to $M^2$, where M is a natural number.

As described above, in case a region having a certain size, if a plurality of data blocks belonging to the same error-correcting code word (for example, product code word mentioned above) exist among data blocks in the region. When an error takes place in the region. Among the error-correcting code words, since there exist the plurality of data blocks containing errors, possibility is raised where the error correction cannot be performed.

Thus, there is a demand for coding and interleaving techniques that can reduce the number of data blocks belonging to a same error-correcting code word included in a region if an error arises two-dimensionally there for the purpose of efficiently correcting errors. Such techniques can be applied to two-dimensional error bursts that give rise to errors over a plurality of channels substantially simultaneously when data are being transmitted by way of a plurality of transmission channels.

In view of the above identified circumstances, it is therefore desirable to provide a data processing method, a data recording apparatus and a data transmission apparatus that can reduce the number of data blocks belonging to a same error-correcting code word for two-dimensional error bursts that give rise to errors over a plurality of tracks of a recording medium or over a plurality of transmission channels.

According to the present invention, there is provided a data processing method for coding digital data by means of predetermined error-correcting codes and allocating them to a plurality of channels, using data blocks of a predetermined length as units, the method including the step of: allocating the coded data to N channels so as to make all N data blocks arranged consecutively in the direction of data arrangement in channels or in the channel arranging direction intersecting (orthogonal to) the direction belong to different error-correcting code words on the N channels and all data blocks existing in a region where a–1 data blocks arranged consecutively in a channel exist in b consecutively arranged channels or where a data blocks consecutively arranged in a channel exist in b–1 channels belong to all different error-correcting code words, where N being the number of the channels (N=a×b, where both a and b are integers not smaller than 2).

Preferably, the error-correcting codes are Reed-Solomon product codes and the data blocks are code words of one of the code series of the Reed-Solomon product codes.

Preferably, with the N×N allocation matrix indicating the data allocation for allocating the N data blocks to the N channels, of a data blocks arranged consecutively in the direction of data arrangement in channels, the a data blocks of one of two adjacent regions located side by side in the direction of data arrangement in channels, each region having a size of a×b so as to occupy b channels arranged consecutively in the channel arranging direction and operating as unit, and belonging to a same error-correcting code word in the region are arranged at positions cyclically shifted by a channel relative to any data blocks in the other region in the b channels, while the data blocks of one of two adjacent regions located side by side in the channel arrangement direction and belonging to a same error-correcting code word in the region are arranged at positions cyclically shifted by a channel relative to any data blocks in the other region in the a data blocks.

The allocated coded data of N channels may be recorded on N recording tracks arranged in parallel with each other on a recording medium. Alternatively, the allocated coded data of N channels may be transmitted by way of N parallel transmission channels.

Preferably, the N is not smaller than six. More preferably, the N is 8, 9, 16 or 24.

Thus, when numbers from 0 through N–1 that represent error-correcting code words that are different from each other are arranged by using N same numbers to form an N×N square to indicate the arrangement of data for allocating N data blocks to N channels according to the present invention, any region having a size of (a–1)×b or a×(b–1) is constituted by numbers all of which are different from each other, if N is a natural number other than a prime number and a is a measure of N but not equal to 1, b being defined by a×b=N, while the characteristic of a Latin square that a same number does not appear twice or more than twice on each row and each column. Then, it is possible to provide the above defined method with error-correcting capabilities that are as good as those of comparable conventional method relative to linear burst errors and better than them for burst errors that spread two-dimensionally.

BRIEF DESCRIPTION OF THE DRAWINGS

FIG. 3 is a schematic illustration of an exemplary allocation of the C1 code words of a plurality of product code words to a plurality of recording tracks;

FIG. 4 is a schematic illustration of an allocation matrix and a Latin square for allocating the C1 code words of a plurality of product code words to a plurality of recording tracks;

FIG. 5 is a schematic illustration of an exemplary perfect Latin square of 9×9 size;

FIG. 6 is a schematic illustration of a two-dimensional error that arises on a plurality of recording tracks where data are allocated and recorded according to FIG. 3;

FIG. 7 is a schematic illustration of a two-dimensional error that arises on a recording pattern where data are allocated and recorded according to FIG. 5;

FIG. 10 is a schematic illustration of an exemplary Latin square of 16×16 size that can be used as allocation matrix for embodiments of the present invention;

FIG. 11 is a schematic illustration of an exemplary square of 16×16 size that can be used as allocation matrix with the technique described in Patent Document 1;

FIG. 12 is a schematic illustration of an exemplary square of 16×16 size that can be used as allocation matrix with the technique described in Non-Patent Document 1;

FIG. 21 is a schematic illustration of an exemplary arrangement of some of the data blocks belonging to the RS product code words on the recording tracks of a tape-shaped recording medium;

FIG. 22 is a schematic illustration of the arrangement of part of the data blocks (C1 code words) on the recording tracks in FIG. 21, with numbers indicating the order of arrangement of C1 information words on a buffer;

FIG. 25 is a schematic illustration of an embodiment using an $M^2 \times M^2$ size square as allocation matrix, where M=2;

FIG. 26 is a schematic illustration of an embodiment using an $M^2 \times M^2$ size square as allocation matrix, where M=3;

FIG. 27 is a schematic illustration of an embodiment using an $M^2 \times M^2$ size square as allocation matrix, where M=5;

FIG. 28 is a schematic illustration of an 8×8 size allocation matrix shown for the purpose of comparison;

FIG. 29 is a schematic illustration of an 8×8 size allocation matrix that can be used for an embodiment of the present invention;

FIG. 30 is a schematic illustration of a 24×24 size allocation matrix that can be used for an embodiment of the present invention;

DETAILED DESCRIPTION OF THE PREFERRED EMBODIMENTS

Now, the present invention will be described in greater detail by referring to the accompanying drawings that illustrate preferred embodiments of data processing method, data recording apparatus and data transmission apparatus according to the invention.

Figure 8:
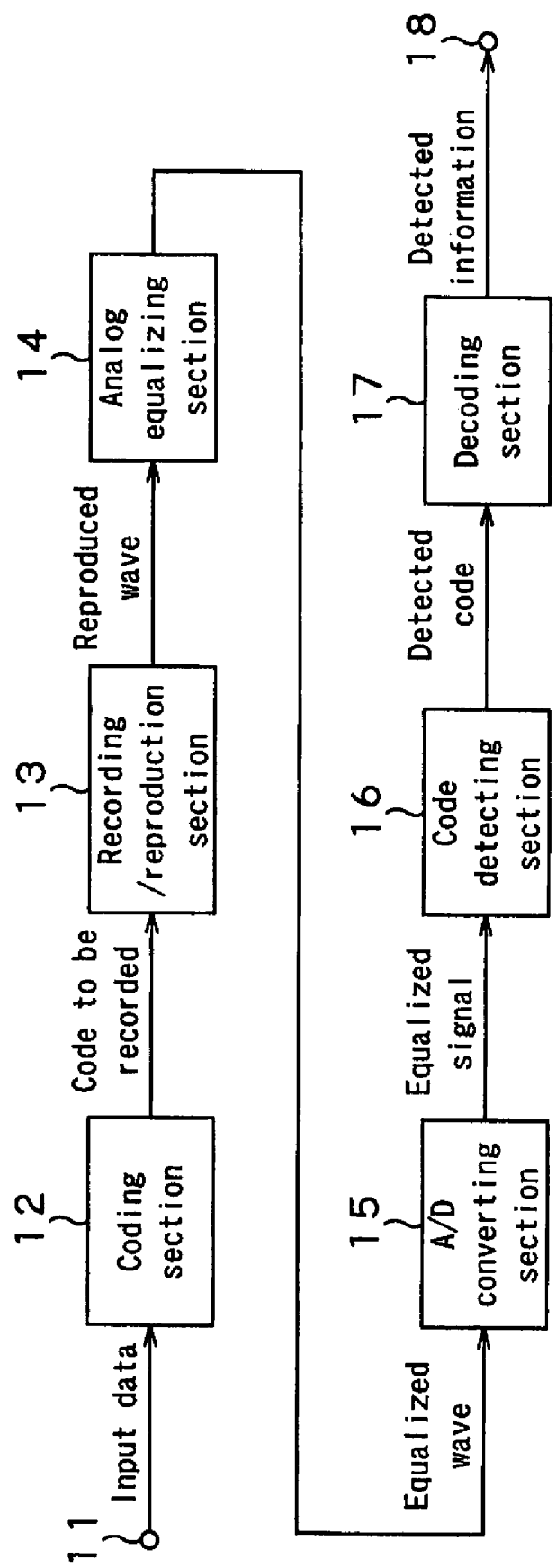
FIG. 8 is a schematic block diagram of an embodiment of the present invention that is a data recording/reproduction apparatus.

FIG. 8 is a schematic block diagram of an embodiment of the present invention that is a data recording/reproduction apparatus. An exemplary method of processing data that involves coding given digital data and interleaving (or shuffling), recording them on a plurality of recording tracks formed on a recording medium in parallel with each other and reproducing them from the recording medium will be described below by referring to FIG. 8.

In the data recording/reproduction apparatus of FIG. 8, the digital data supplied to it by way of input terminal 11 are sent to coding section 12 and subjected to error-correcting/coding and interleaving (shuffling). Then, the obtained output (codes to be recorded) are sent to recording/reproduction section 13, where they are recorded on a plurality of recording tracks formed on a recording medium and reproduced. The output (regenerated wave) from the recording/reproduction section 13 is then sent to analog equalizer section 14 for analog equalization and the output (equalized wave) of the analog equalizer section 14 is transmitted to A/D converter section 15 and converted into digital data (equalized signal). Then, the output of the A/D converter section 15 is sent to code detecting section 16. In the code detecting section 16, the digital data (equalized signal) from the A/D converter section 15 is detected as a code series and the obtained detected signal is decoded by decoding section 17 as data. The output (detected information) from the decoding section 17 is taken out from output terminal 18.

This embodiment of the invention is specifically assumed to be a multi-head linear tape recording/reproduction apparatus adapted to record data on and reproduce data from a plurality of (N) recording tracks running in parallel with the longitudinal direction of a tape-shaped recoding medium such as a magnetic tape. Then, the coding section 12 encodes the input digital data coming from the input terminal 11 by means of predetermined error-correcting codes, divides the obtained coded data into data block having a predetermined length and allocates them to the N-channels corresponding to the N recording tracks arranged in parallel on the recording medium. The above described number of channels N can be expressed as N=a×b, where both a and b are integers not smaller than 2.

Figure 9:
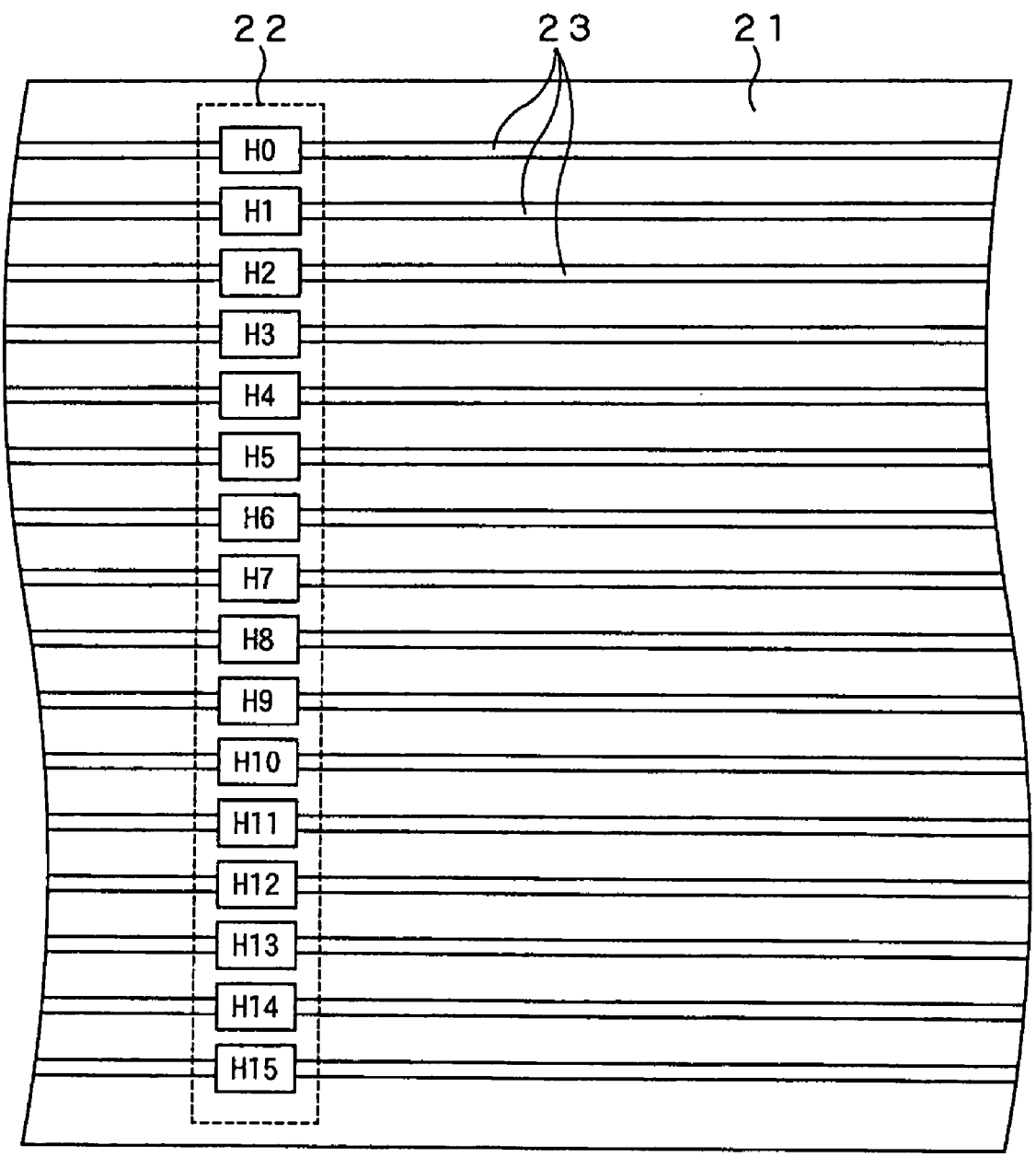
FIG. 9 is a schematic illustration of the recording/reproduction head section of an embodiment of present invention that is a multi-head linear tape recording/reproduction apparatus and the recording tracks on a recording medium to be used with the embodiment, illustrating a possible arrangement thereof.

FIG. 9 is a schematic illustration of the recording/reproduction section 13 of the embodiment that is a multi-head linear tape recording/reproduction apparatus and the recording tracks on a recording medium to be used with the embodiment, illustrating a possible arrangement thereof. In the recording/reproduction section 13, as shown in FIG. 9, data of 16 channels are recorded in parallel on the tape-shaped recording medium 21 such as a magnetic tape by using a multi-head section 22 having N recording heads, which are 16 recording heads H0 through H15 in FIG. 9, so as to form 16 recording tracks 23 and the recorded data of 16 channels are reproduced from the 16 recording tracks 23 in parallel. The recording heads H0 through H15 of the multi-head section 22 are arranged at regular intervals of about 100 µm and the recording tracks 23 are also arranged at the same regular intervals on the tape-shaped recording medium 21. It is not necessary that the recording tracks 23 are physically arranged side by side on the tape-shaped recording medium 21. In other words, other recording tracks may exist between any two adjacent ones of the recording tracks 23. Additionally, the present invention can be applied not only to a multi-head linear tape recording/reproduction apparatus as described above but also to a helical tape recording/reproduction apparatus. When the present invention is applied to a helical tape recording/reproduction apparatus, recording tracks are arranged obliquely in parallel with each other on a tape-shaped recording medium and data of the same number of channels, 16 channels for example, are recorded on the 16 tracks of the recording medium and reproduced from the latter. The present invention can equally be applied to a disc-shaped recording medium such as an optical disc. Then, data of 16 channels are recorded on the same number of recording tracks, or 16 tracks, arranged radially side by side on the disc-shaped recording medium and reproduced from the latter.

Figure 1:
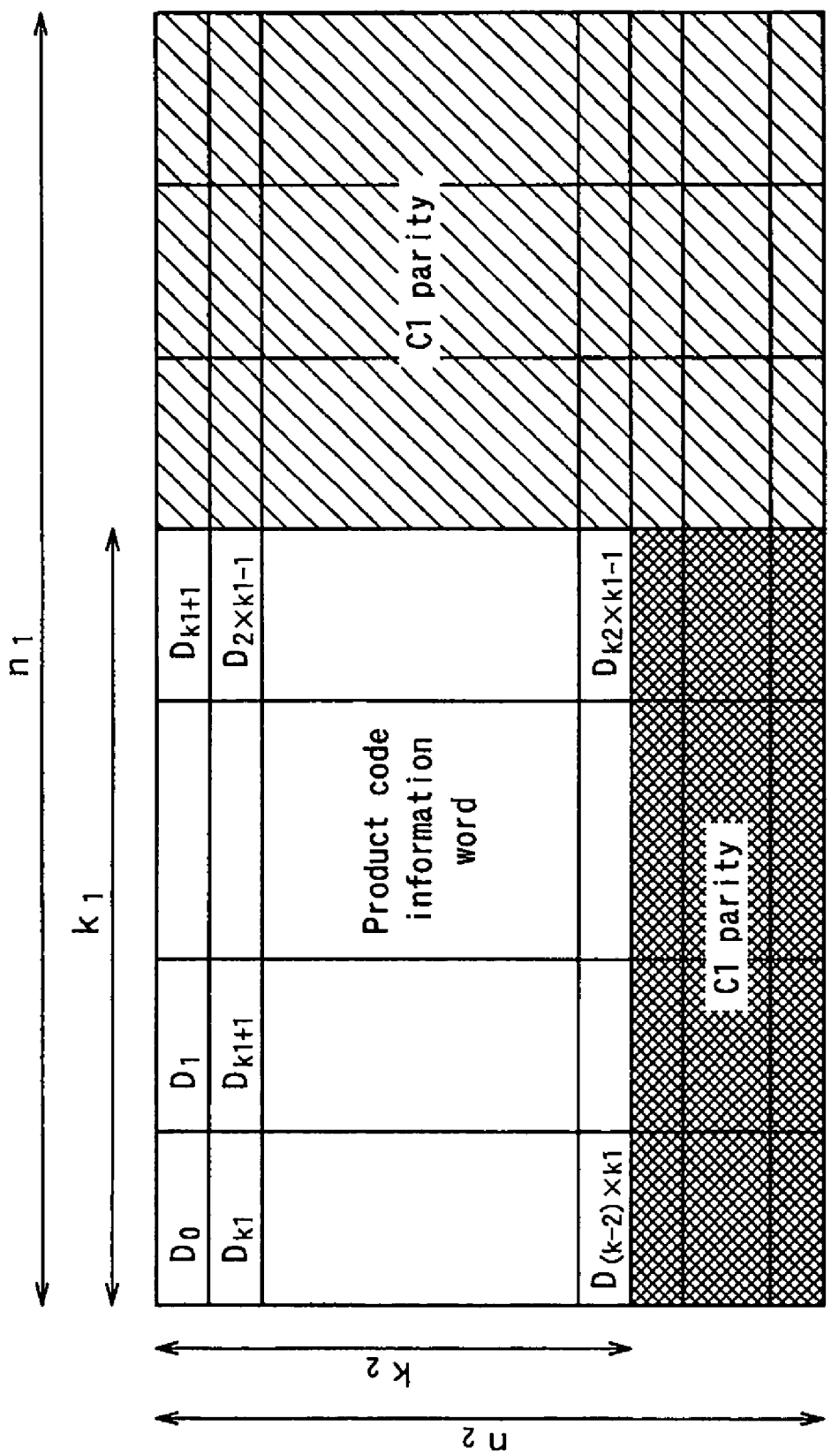
FIG. 1 is a schematic illustration of a product code word formed by combining C1 code words and C2 code words, showing an exemplary configuration thereof.
Figure 2:
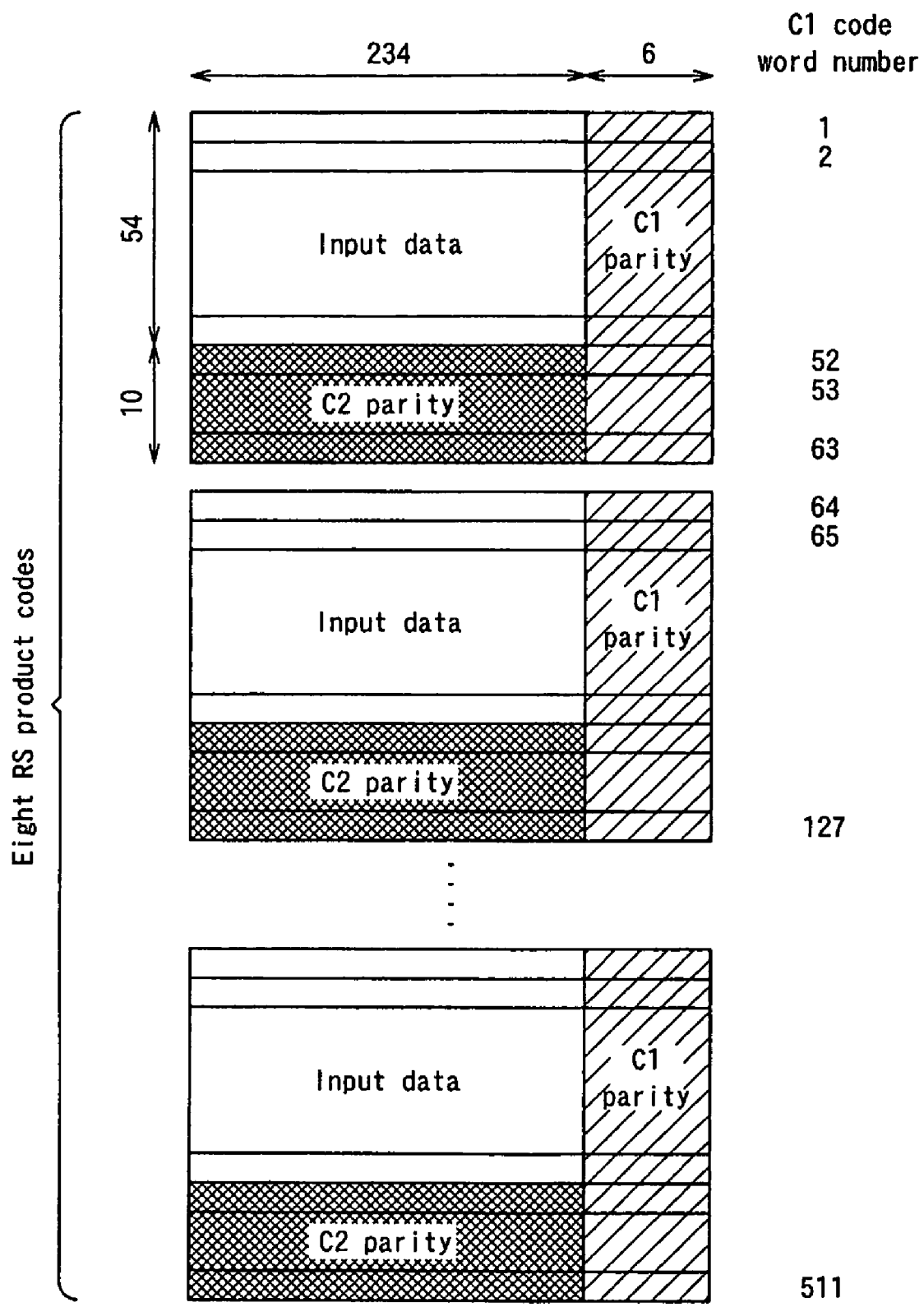
FIG. 2 is a schematic illustration of a plurality of product code words and C1 code words.

The coding section 12 of FIG. 8 will be described farther below. The input digital data (information words) supplied to the coding section 12 by way of the input terminal 11 are divided into N units of product code information words and the divided data are then coded. As described earlier by referring to FIG. 1, each product code information word becomes a product code word formed by adding the parities of an RS product code. Each row of the RS product code word corresponds to a C1 code word and used as a data block, or a recording unit. In other words, a C1 code word is recorded in a continuous region of a channel (recording track) as a data block. When data are coded as product codes, the coding process involves interleaving (shuffling) so that the C1 code words (data blocks) that belong to a same RS product code word are recorded at locations on the recording medium that are separated from each other. Then header information is added to each C1 code word (data bock) of coded data obtained as a result of the coding process. Then, the C1 code words (data blocks) are randomized and subjected to a channel coding process before they are recorded on the recording medium. For the purpose of the present invention, an information word such as a product code information word or a C1 information word refers to a code word from which parities are removed.

In this embodiment of the present invention, digital data are coded by means of predetermined error-correcting codes such as RS product codes, allocated to N channels (e.g., 16 channels) using data blocks (C1 code words) having a predetermined length as units and recorded on N recording tracks that are arranged in parallel with each other. At this time, the coded data are allocated to N channels so as to make all N data blocks arranged consecutively in the direction of data arrangement in channels or in a channel arranging direction intersecting the direction belong to different error-correcting code words on the N channels and all data blocks existing in a region where a−1 data blocks consecutively arranged in a channel exist in b consecutively arranged channels or in a region where a data blocks consecutively arranged in a channel exist in b−1 channels belong to all different error-correcting code words. With an N×N allocation matrix (interleaving matrix or shuffling matrix) indicating the data allocation for allocating the N data blocks to the N channels according to the invention, of a data blocks arranged consecutively in the direction of data arrangement in the channels, the data blocks of one of two adjacent regions located side by side in the direction of data arrangement in the channels, each region having a size of a×b so as to occupy b channels arranged consecutively in the channel arranging direction and operating as unit, and belonging to a same error-correcting code word in the region are arranged at positions cyclically shifted by a channel relative to any data blocks in the other region in the b channels, while the data blocks of one of two adjacent regions located side by side in the channel arrangement direction and belonging to a same error-correcting code word in the region are arranged at positions cyclically shifted by a channel relative to any data blocks in the other region in the a data blocks.

Now, an allocation matrix where the number of channels N is expressed by a×b and a=b=M will be described below. M is a natural number larger than 1 (an integer not smaller than 2) and the data blocks (C1 code words) of the coded data are allocated (interleaved, or shuffled) using a $M^2 \times M^2$ size square to be used for the allocation matrix. N=16 and hence M=4 in the above described embodiment of recording/reproduction apparatus that is a multi-head linear tape recording/reproduction apparatus including a multi-head section 22 having 16 recording heads H0 through H15 as shown in FIG. 9. Therefore, the allocation matrix is a 16×16 size square as shown in FIG. 10. Then, the data blocks (C1 code words) that belong to 16 product code words are allocated to the recording track 0 through track 15 for the 16 channels according to the square as shown in FIG. 10. In FIG. 10, the symbols 0 through f in the 16×16 size square represent the numbers assigned to the 16 product code words to which the data blocks (C1 code words) that are arranged respectively to those locations. Note that alphabets a through f represent numbers 10 through 15 respectively. For example, the hatched partitions in FIG. 10 are areas where the data blocks that belong to the 0-th product code word of the 16 product code words are arranged.

It may be clear by seeing the 16×16 ($M^2 \times M^2$) size square to be used as allocation matrix in FIG. 10 that the coded data are allocated to the channels in such a way that all the 16 (N) data blocks that are consecutively arranged in the direction of data arrangement in the channels and the channel arrangement direction that intersects the former direction belong to different error-correcting code words and that all the data blocks that exist in a region where three (a−1) data blocks arranged consecutively in a channel occupy over four (b) consecutively arranged channels or in a region where four (a) data blocks arranged consecutively in a channel over three (b−1) consecutively arranged channels belong to different error-correcting code words. Such an allocation matrix is obtained when a (4) data blocks of one of two adjacent regions located side by side in the direction of data arrangement in the channels, each region having a size of 4×4 (a×b) so as to occupy 4 (b) channels arranged consecutively in the channel arranging direction and operating as unit, and belonging to a same error-correcting code word in the region are arranged at positions cyclically shifted by a channel relative to any data blocks in the other region in the 4 (b) channels, while the data blocks of one of two adjacent 4×4 size regions located side by side in the channel arrangement direction and belonging to a same error-correcting code word in the region are arranged at positions cyclically shifted by a channel relative to any data blocks in the other region in the 4 data blocks (a data blocks). In other words, as for the hatched partitions belonging to the 0-th product code word, the data block located at the upper left corner of the upper left 4×4 region and the data block located at the left end on the second row in the uppermost second left 4×4 region belong to the same 0-th product code word. In other words, the position of the data block of the latter region is shifted downward by a channel from the position of the data block of the former region. Similarly, the data block located at the left end on the second row in the uppermost second left 4×4 region and the data block located at the left end on the third left end of the uppermost third 4×4 region belong to the same 0-th product code word. In other words, the position of the data block of the latter region is shifted downward by a channel from the position of the data block of the former region. The downward shifts by one channel occur cyclically in the four channels in the 4×4 regions. For example, the data block belonging to the 4-th product code in the upper left 4×4 region is located at the left end on the fourth row but is shifted to the left end on the first row in the uppermost second left 4×4 region. The data block located at the upper left corner of the upper left 4×4 region and the data block located at the second left position on the first row in the uppermost second left 4×4 region belong to the same 0-th product code word. In other words, the position of the data block of the latter region is shifted rightward by a channel from the position of the data block of the former region. The rightward shifts by one channel occur cyclically in the vertically arranged 4×4 regions.

Thus, when numbers from 0 through N−1 that represent error-correcting code words that are different from each other are arranged by using N same numbers to form an N×N (e.g., 16×16) square of this embodiment to make it operate as allocation matrix, any region having a size of (a−1)×b or a×(b−1) (a size of 3×4 or 4×3 for example) is constituted by numbers all of which are different from each other, if N is a natural number other than a prime number and a is a measure of N but not equal to 1, while the characteristic of a Latin square that a same number does not appear twice or more than twice on each row and each column. Then, it is possible to provide the above defined method with error-correcting capabilities that are as good as those of comparable conventional method relative to linear burst errors and better than them for burst errors that spread two-dimensionally.

For the purpose of comparison, FIG. 11 shows a schematic illustration of an exemplary square of 16×16 size that can be used as allocation matrix with the technique described in Patent Document 1 and FIG. 12 shows a schematic illustration of an exemplary square of 16×16 size that can be used as allocation matrix with the technique described in Non-Patent Document 1.

Table 1 below shows the maximum numbers of error events that can be corrected under guarantee regardless of the positions of the error events on a recording medium, assuming that all the C1 code words (data blocks) contained in a region of the size of α×β become errors when an $M^2 \times M^2$ size square is used as allocation matrix.

TABLE 1

| | α × β | | | |
|---|---|---|---|---|
| method | $\alpha < M - 1$ $\beta < M - 1$ | $\alpha = M - 1$ $\beta = M - 1$ | $\alpha = M - 1$ $\beta = M$ | $\alpha = M$ $\beta = M - 1$ |
| A | $(d_2 - 1)/$ min(x, y) | $(d_2 - 1)/$ $(M - 1)$ | $(d_2 - 1)/$ $(M - 1)$ | $(d_2 - 1)/$ $(M - 1)$ |
| B | $d_2 - 1$ | $d_2 - 1$ (M is an odd number) $(d_2 - 1)/$ 2 (M is an even number) | $(d_2 - 1)/2$ | $(d_2 - 1)/2$ |
| C | $d_2 - 1$ | $d_2 - 1$ | $d_2 - 1$ | $d_2 - 1$ |

In Table 1, A shows the maximum number when the technique described in Patent Document 1 is used and B shows the maximum number when the technique described in Non-Patent Document 1 is used while C shows the maximum number when the technique of this embodiment of the present invention. In Table 1, $d_2$ represents the minimum distance of C2 ($n_2$, $k_2$, $d_2$) codes of RS product codes. Note that any regions of the size of α×β do not overlap each other for each error event. From Table 1, it may be clear that the interleaving method of this embodiment can correct two-dimensional burst errors more efficiently than the conventional techniques. If compared with the use of perfect Latin squares according to the Non-Patent Document 1, the interleaving method of this embodiment can correct two-dimensional burst errors more efficiently when M is not smaller than 3.

Figure 13:
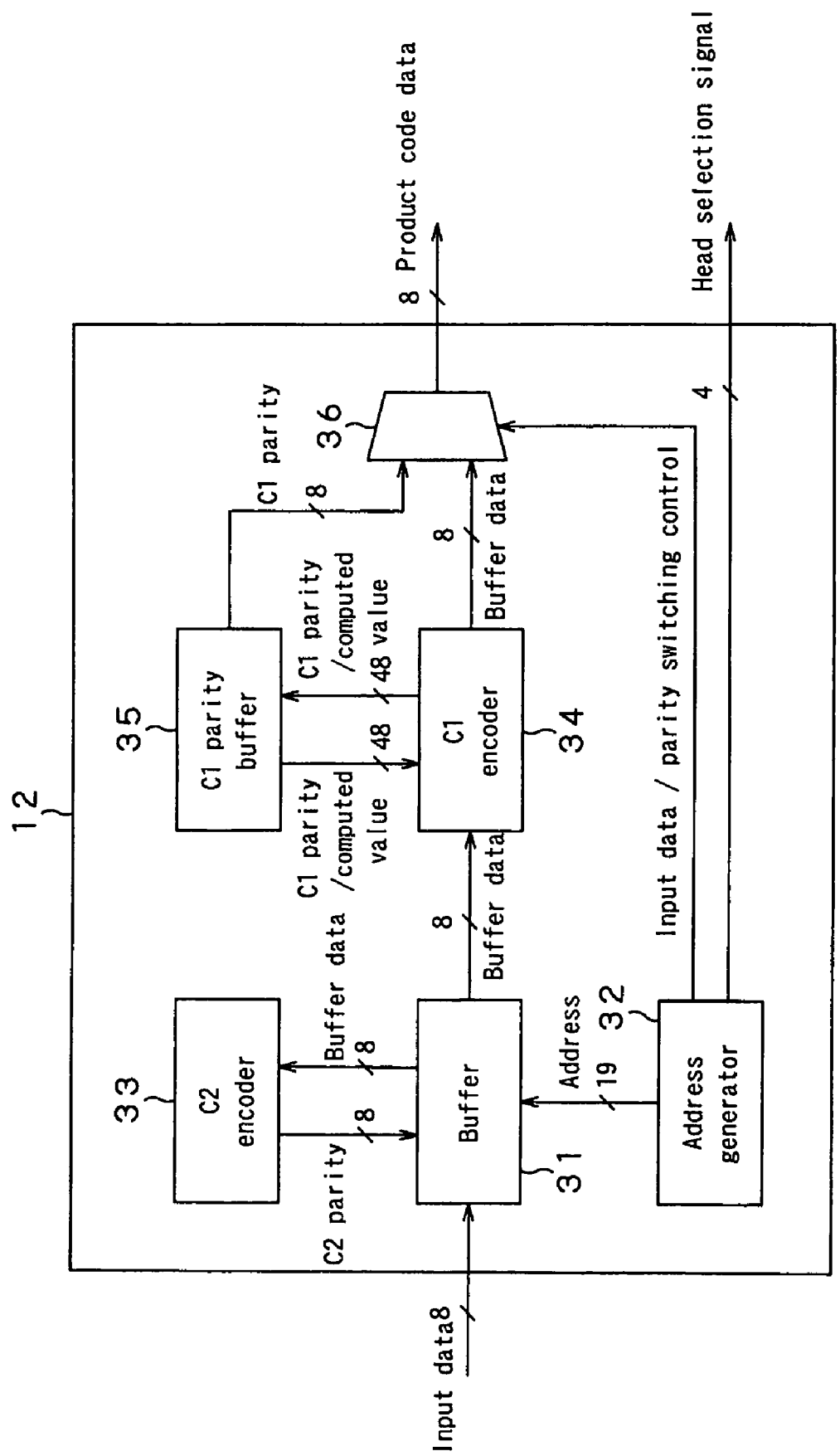
FIG. 13 is a schematic block diagram of the coding section of an embodiment of the present invention, showing the configuration thereof.
Figure 14:
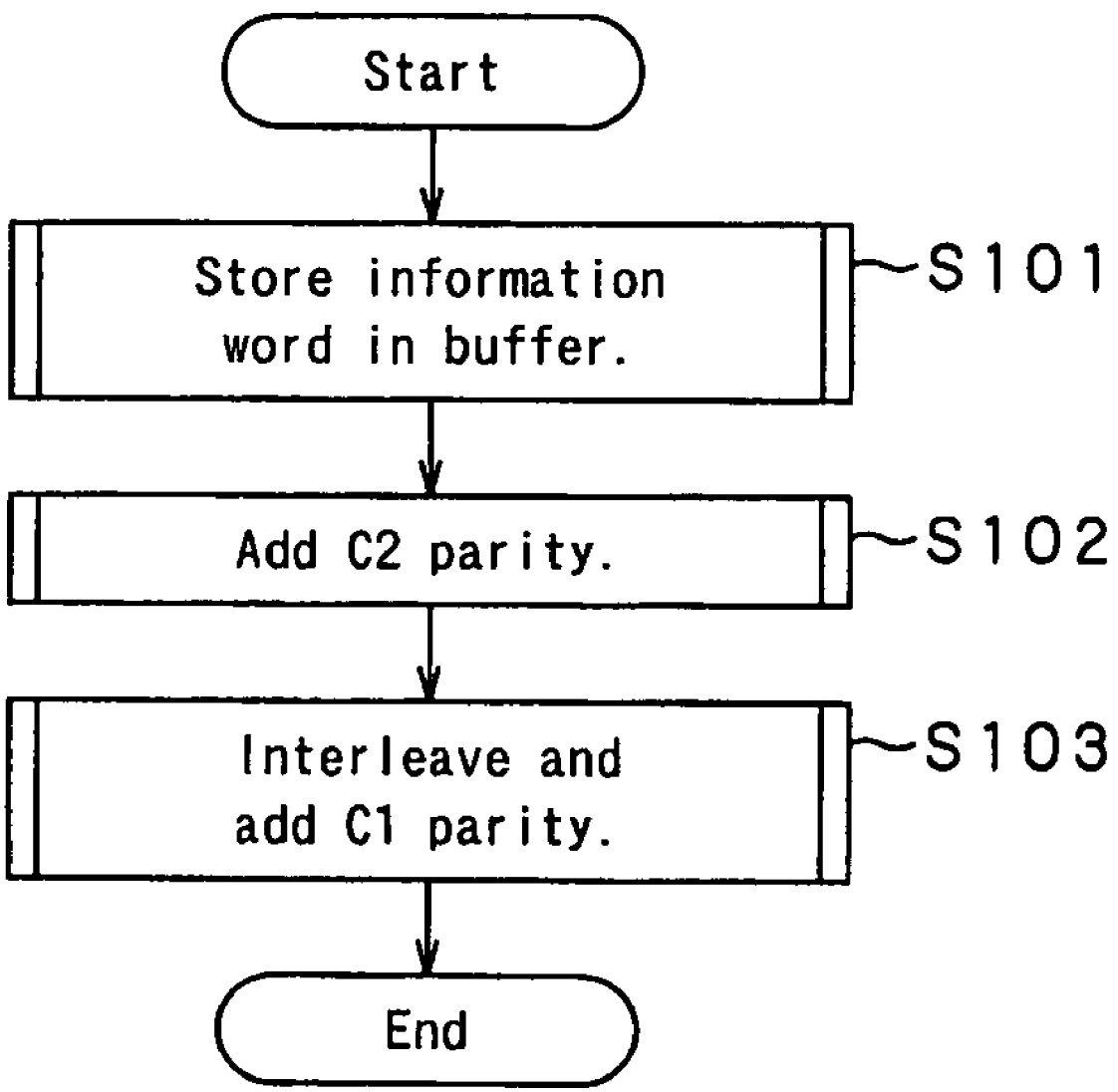
FIG. 14 is a flow chart of the processing operation of the coding section of an embodiment of the present invention.

FIG. 13 is a schematic block diagram of the coding section 12 of this embodiment of the present invention, showing the configuration thereof and FIG. 14 is a flow chart of the processing operation of the coding section 12 of the embodiment.

Referring to FIG. 13, the input data from the input terminal 11 shown in FIG. 8 are sent to a buffer 31 of the coding section 12. Referring now to FIG. 14, in Step S101, the data input to the buffer 31 are sequentially stored on a byte by byte basis as information words and the addresses to be used for writing the data to the buffer are generated by an address generator 32. In Step S102 of FIG. 14, firstly read addresses for reading data from the buffer 31 are generated by the address generator 32 for adding C2 parities and the input data are sent from the buffer 31 to a C2 encoder 33 on a byte by byte basis. When all the C2 information words are input, C2 parities are output from the C2 encoder 33 on a byte by byte basis and stored to the positions in the buffer 31 indicated by the write addresses generated by the address generator 32. Then, in Step S103 of FIG. 14, the input data and the C2 parities stored in the buffer 31 are input to a C1 encoder 34 on a byte by byte basis for interleaving and adding C1 parities. At this time, address generator 32 generates read addresses to be used for reading data from the buffer 31 so that data are recorded on a recording medium by units of C1 code words. The C1 encoder 34 computes C1 parities for the input data and stores them in a C1 parity buffer 35. The C1 parity buffer 35 includes a register for storing the data of "the number of RS product code words to be interleaved×the number of C1 parities". C1 information words are output on a byte by byte basis so long as the part that corresponds to C1 information words is input and, after the completion of the computation for C1 parities, the contents of the C1 parity buffer 35 are output byte by byte.

Now, an operation of recording 16 RS product code words on 16 tracks, using RS (240, 234, 7) codes on GF ($2^8$) as C1 codes and RS (128, 108, 21) codes on GF ($2^8$) as C2 codes, will be described below.

An operation as described below will be conducted in Step S101 in FIG. 14. The input data (data [0, 1, . . . , 404351]) of bytes from the input terminal 11 of FIG. 8 are divided by 25272 bytes that corresponds to an information word (an RS product code word without parities) in the 404352 code words sent from the coding section 12 of FIG. 13 to produce 16 parts. An information word of 25272 bytes corresponds to information words contained in 108 C1 code words. Then, the 16 product code information words are stored in the buffer 31 (buf [0, 1, . . . , 479231]).

Figure 15:
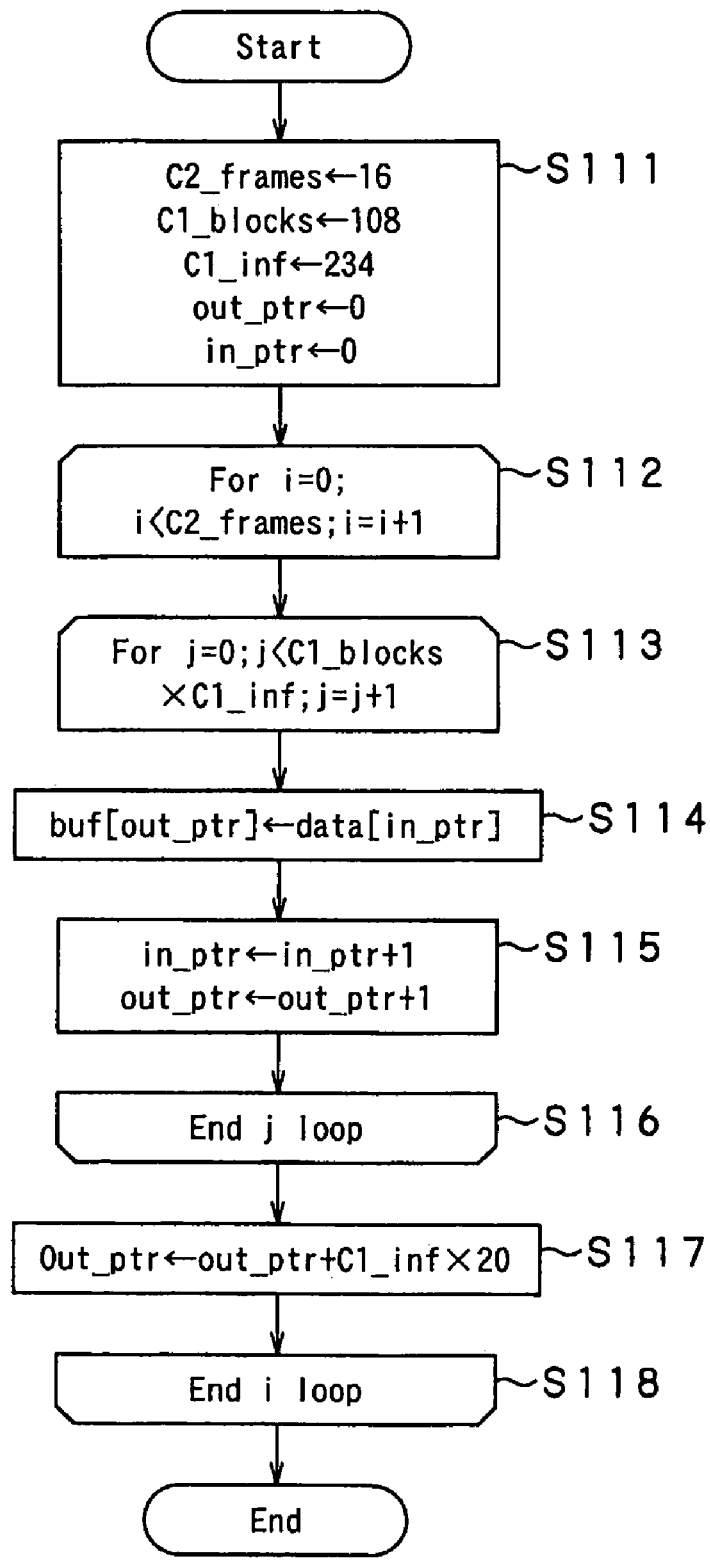
FIG. 15 is a flow chart of the processing operation of the coding section for storing information words in a buffer.
Figure 16:
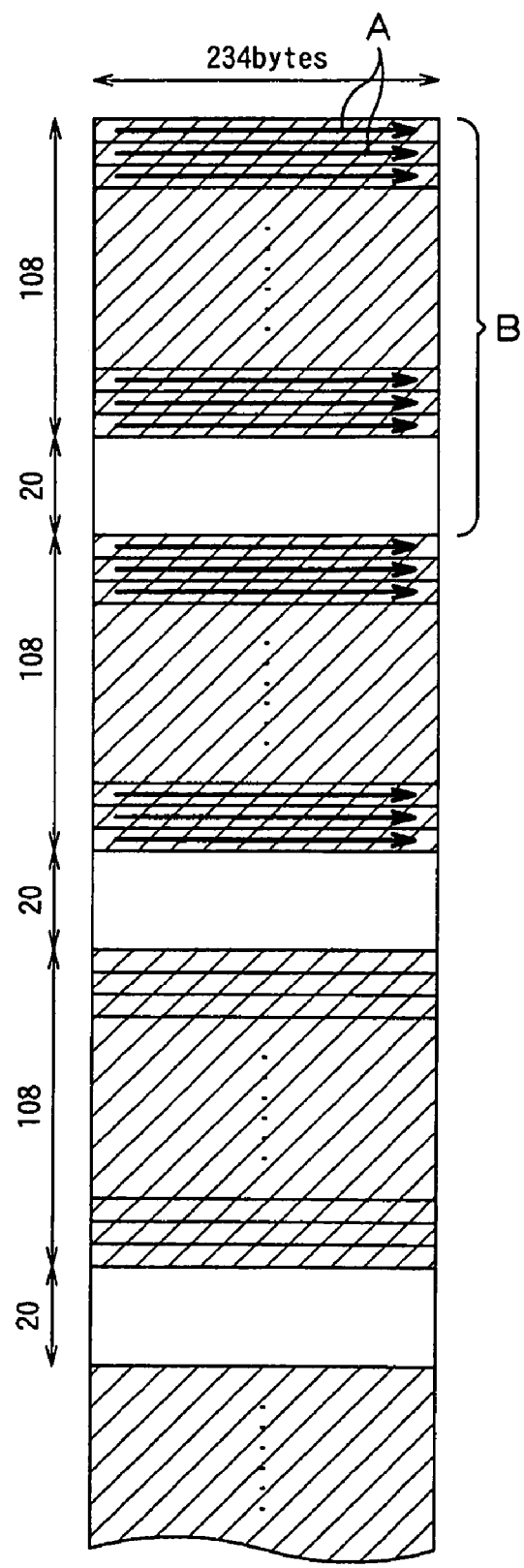
FIG. 16 is a schematic illustration of storage positions of information words in the buffer of the coding section.

FIG. 15 is a flow chart of the operation of Step S101, illustrating it more specifically. Referring to FIG. 15, variable C2_frames and variable C1_blocks indicate respectively the number of product code words and the number of C1 code words that include the input data contained in a product code word, while variable C1_inf indicates the C1 information word length and variables out_ptr and in_ptr are pointers for storing the input positions and the output positions of the buffer respectively. The variables C2_frames, C1_blocks, C1_inf, out_ptr, in_ptr are made to store the respective initial values and, of the for loop from Step S112 to Step S118, the processing operations from Step S113 to S117 are repeated so long as the conditions of Step S112 are satisfied, incrementing the loop variable i. Of the for loop from Step S113 to Step S116, the processing operations from Step S114 to Step S115 are repeated so long as the conditions of Step S113 are satisfied, incrementing the loop variable j. In Step S114, k in buf [k] represents the buffer of the k-th byte and data [k] represents the input data of the k-th byte. In the process of FIG. 15, the input data that correspond to a product code information word are stored as 108 C1 code words on a byte by byte basis. Thereafter, a region of 234×20 bytes is evacuated and the operation of storing the following input data by means of the same technique is repeated for 16 times. After the above described processing operations, the data (information words) in the buffer 31 of FIG. 13 turns out to be as the hatched parts in FIG. 16. In FIG. 16, arrow A 16 indicates the write direction of input data and region B indicates the region of the first (0-th) product code information word of the eight product code words and the C2 parities.

Figure 17:
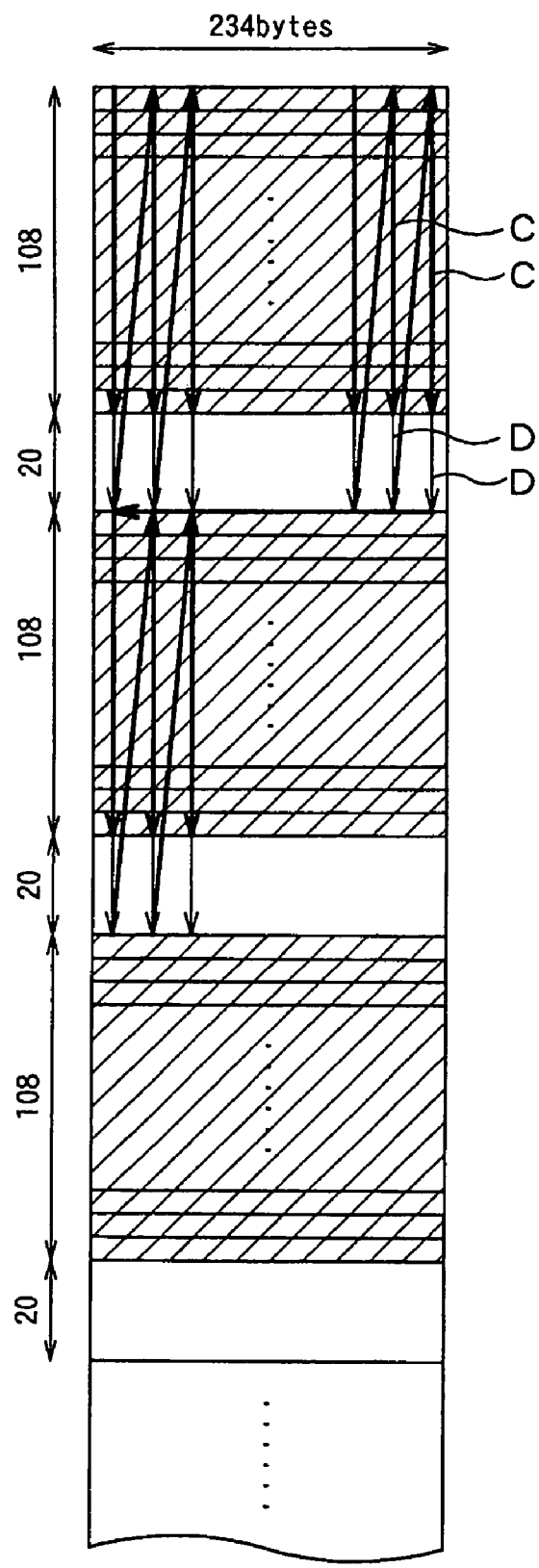
FIG. 17 is a schematic illustration of the directions in which data are read and written in a processing operation of adding C2 parities, using the buffer of the coding section.

Then, with respect to a region of 234 bytes×108 blocks, data of 108 bytes are read out in the vertical direction as indicated by arrow C in FIG. 17 and input to the C2 encoder 33 in FIG. 13 on a byte by byte basis. The C2 encoder 33 is adapted to generate C2 parities for the above cited RS (128, 108, 21) codes. The formula (1) below is the parity generation polynominal of the C2 encoder 33.

$$g_2(x) = \prod_{i=0}^{19} (x - \alpha'_2) \quad (1)$$

In the above formula (1), α2 is the solution of p2(x)=0, where p2(x) is defined by the formula (2) shown below.

$$p_2(x) = x^8 + x^4 + x^3 + x^2 + x + 1 \quad (2)$$

Figure 18:
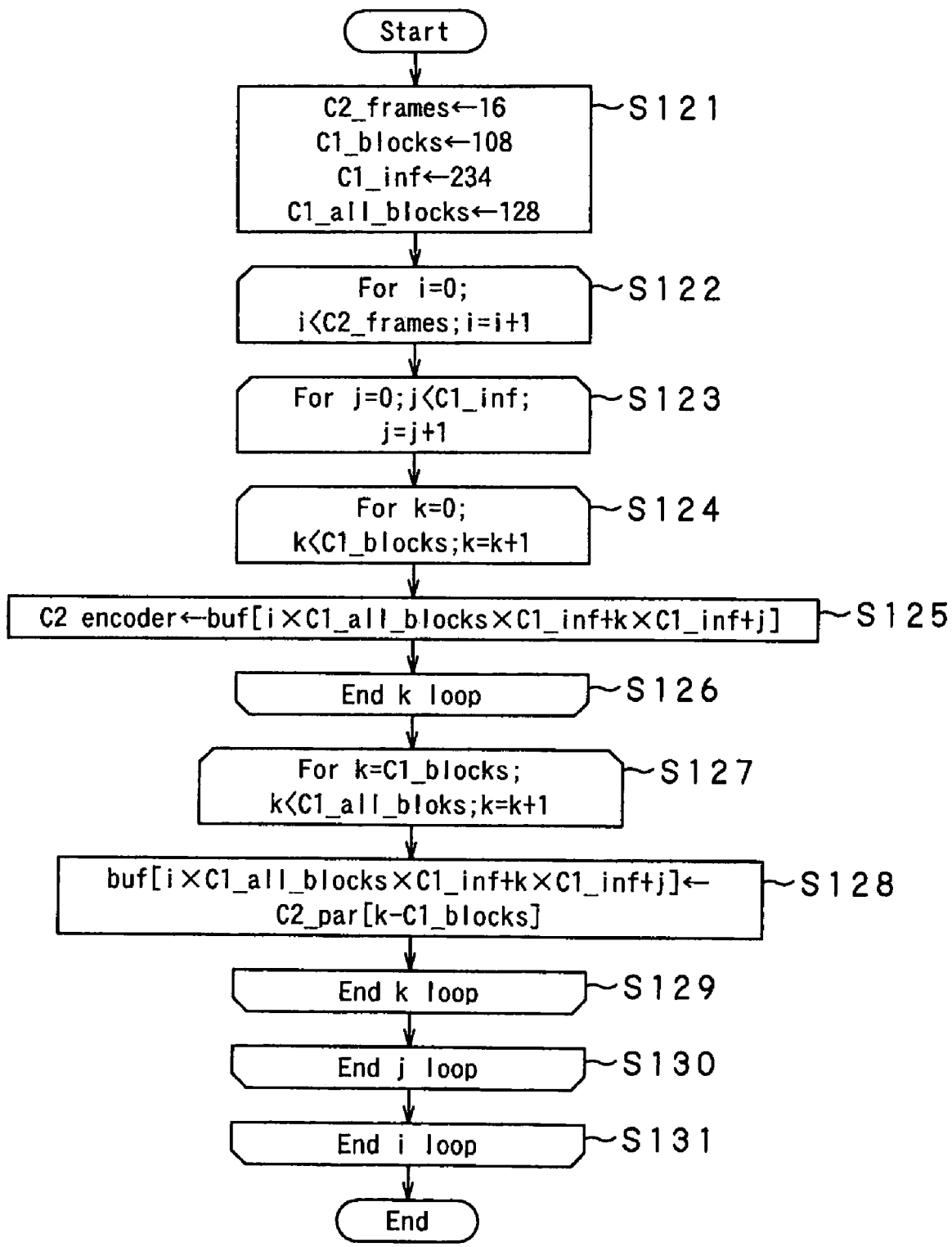
FIG. 18 is a flowchart of a-specific processing operation of adding C2 parities in the coding section.

As C2 information words of 108 bytes are input to the C2 encoder 33 of FIG. 13 on a byte by byte basis, C2 parities (C2_par [0, 1, . . . , 19]) of 20 bytes are sequentially output from the C2 encoder 33 on a byte by byte basis. The C2 parities are then written in the direction indicated by arrow D in FIG. 17 in the regions (regions for C2 parities) of the columns same as the columns where the C2 information words input to the buffer 31 are written. The above operation is repeated for all the 234 columns per product code information word. The same process is applied to all the remaining 15 product code information words. The process corresponds to Step S102 in FIG. 14. FIG. 18 shows a flow chart of a specific algorithm of Step S102.

Now, referring to FIG. 18, variable C2_frames indicates the number of product code words and variable C1_blocks indicates the number of C1 code words contained in a product code word, while variable C1_inf indicates the C1 information word length and variable C1_all_blocks indicates the total number of C1 code words contained in the product code words. In the first step, or Step S121, in FIG. 18, the variables C2_frames, C1_blocks, C1_inf and C1_all_blocks store their respective initial values. Note that, in Steps S125 and S128, buf [j] indicates the buffer data of the j-th byte and C2_par [j] indicates the parity of the j-th byte. Of the for loop from Step S122 to Step S131, the processing operations from Step S123 to Step S130 are repeated so long as the conditions of Step S122 are satisfied, incrementing the loop variable i. Of the for loop from Step S123 to S130, the processing operations from Step S124 to Step S129 are repeated so long as the conditions of Step S123 are satisfied, incrementing the loop variable j. Of the for loop from Step S124 to Step S126, the processing operation of Step S125 is repeated so long as the conditions of Step S124 are satisfied, incrementing the loop variable k. Finally, of the for loop from Step S127 to Step S129, the processing of Step S128 is repeated so long as the conditions of Step S127 are satisfied, incrementing the loop variable k.

After the above-described processing operations, the data in the buffer 31 of FIG. 13 turns out to be as shown in FIG. 16. Thus, the 16 product code information words to which C2 parities are added are acquired in the buffer.

Now, the processing operations of reading the data in the buffer 31 of FIG. 13, sending them to the C1 encoder 34, where C1 parities are added to them to produce C1 code words, and transmitting the C1 code words to (the recorder/encoder and the recording heads of) the recording/reproduction section 13 of FIG. 8 and recording them there will be described below. When the data are recorded on a tape-shaped recording medium, a total of 16 C1 code words (data blocks) are recorded in parallel respectively on the 16 recording tracks 23 of the recording medium by means of 16 recording heads H0 through H15 as described above by referring to in FIG. 9.

Figure 20:
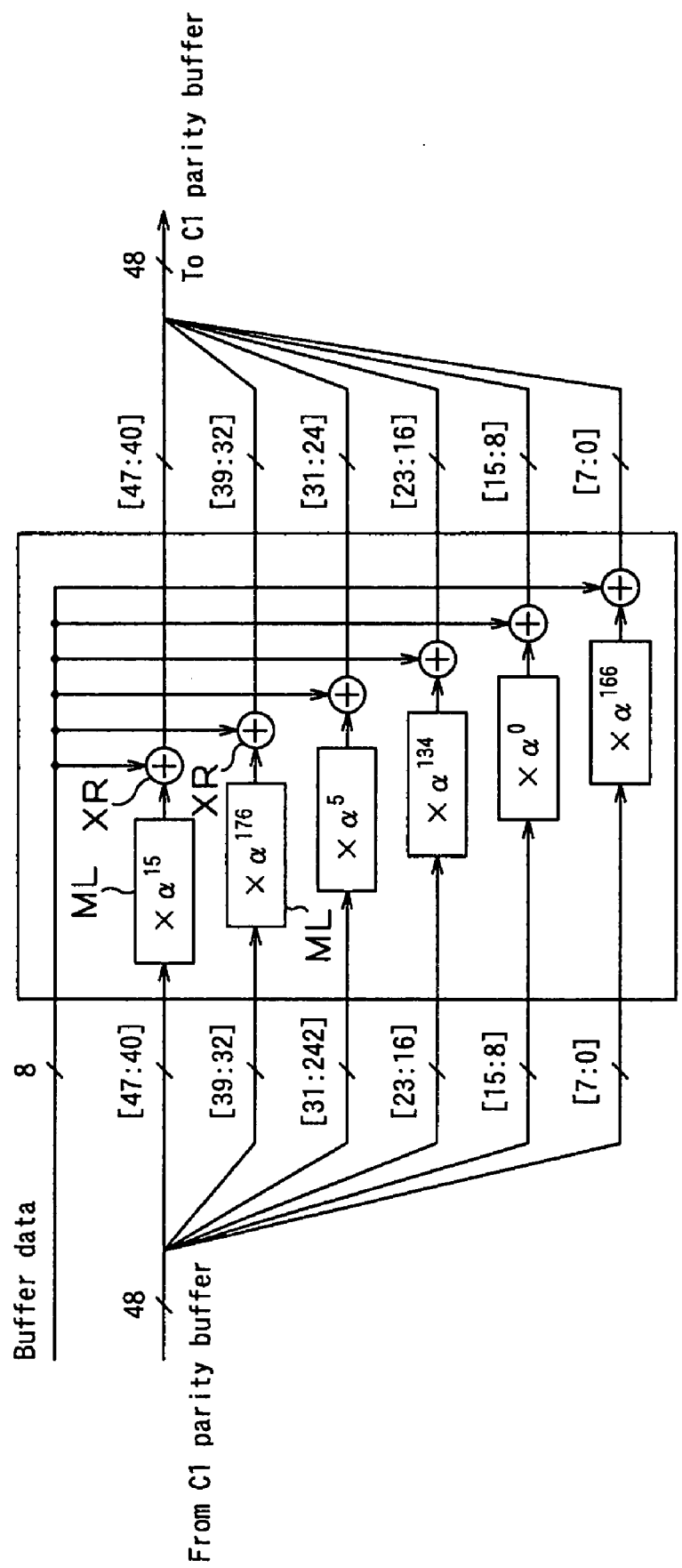
FIG. 20 is a schematic block diagram of a principal part of the C1 encoder of the coding section, showing an exemplary configuration thereof.

FIG. 20 is a schematic block diagram of a principal part of the C1 encoder 34 of FIG. 13. Referring to FIG. 20, the multiplier ML is adapted to conduct multiplications on a Galois Field whereas the adder XR is adapted to conduct exclusive ORs (XORs). The C1 encoder is adapted to generate C1 codes for the above-cited RS (240, 234, 7) codes. The formula (3) below is the parity generation polynominal of the C1 encoder 34.

$$g_1(x) = \prod_{i=0}^{5} (x - \alpha'_1) \qquad (3)$$

In the above formula (3), α1 is the solution of p1(x)=0, where p1(x) is defined by the formula (4) shown below.

$$p_1(x)=x^8+x^4+x^3+x^2+x+1 \qquad (4)$$

Figure 19:
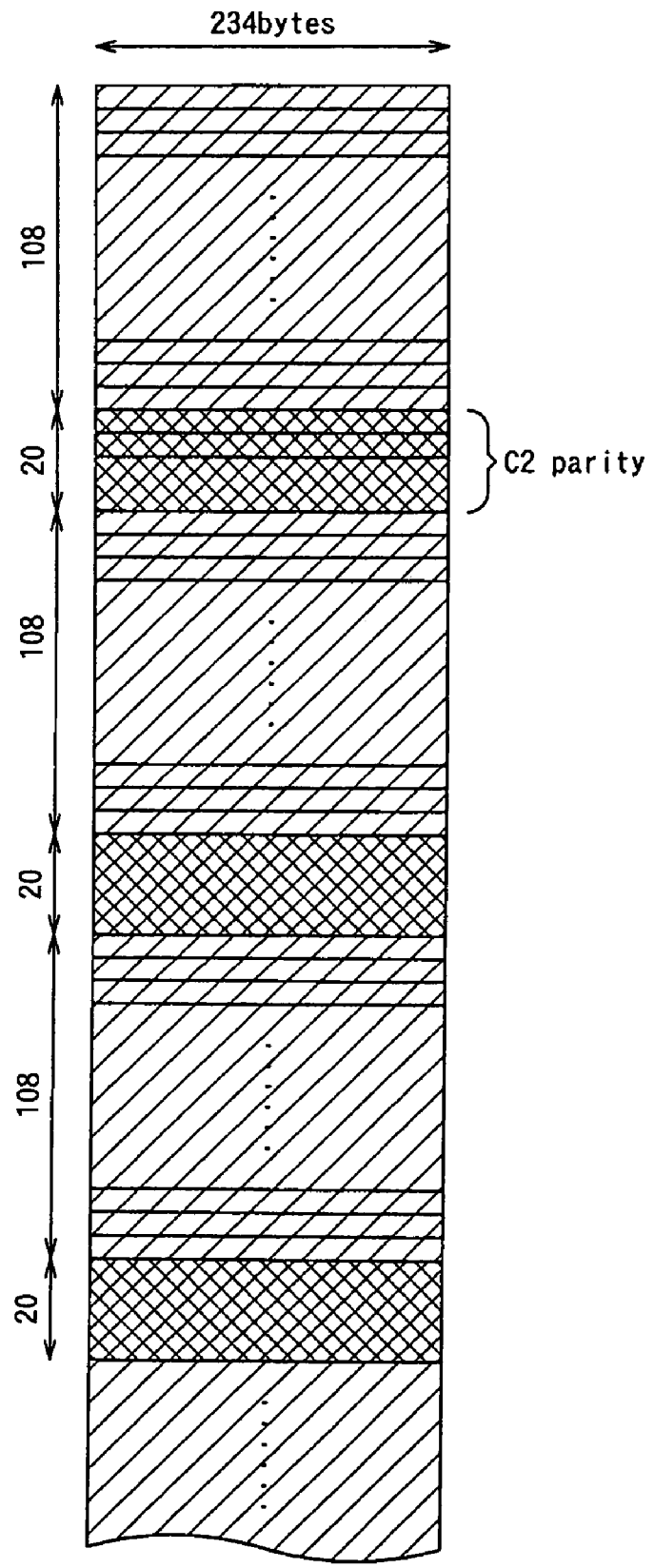
FIG. 19 is a schematic illustration of the buffer of the coding section where C2 parities are added.

As 16 RS product code information words, to which C2 parities are added as shown in FIG. 19, are accumulated in the buffer 31 of FIG. 13, a C1 information word (234 bytes) is selected from each of the RS product code information words (234 bytes×128 blocks) and read out on a byte by byte basis. As the data of a byte in each of the C1 information words read out from the buffer 31 is input to the C1 encoder 34, the C1 encoder 34 reads in the 48 bits that indicate the parity value of the C1 code word, to which the buffer data belongs, that is being computed and the parity value is updated by the input 1-byte buffer data and transmitted to the C1 parity buffer 35. In this way the C1 parity is determined for the C1 information word. A C1 information word (234 bytes) is read out from each of the 16 RS product code information words (234 bytes×128 blocks) and hence the data of a total of 16 C1 information words are read out and output by way of the multiplexer (or switch) 36. Subsequently, the C1 parities corresponding to the respective information words that are accumulated in the C1 parity buffer 35 are output by way of the multiplexer 36 on a bye by byte basis, transmitted to the recording/reproduction section 13 of FIG. 8 and recorded on the 16 recording tracks of a recording medium (which may be a tape-shaped recording medium). At this time, head selection (channel selection) signals are output from the address generator 32 and the data to be recorded are allocated (interleaved, shuffled) to the recording tracks (channels) for the C1 code words (data blocks) typically according to an allocation matrix as shown in FIG. 10.

Figure 21:
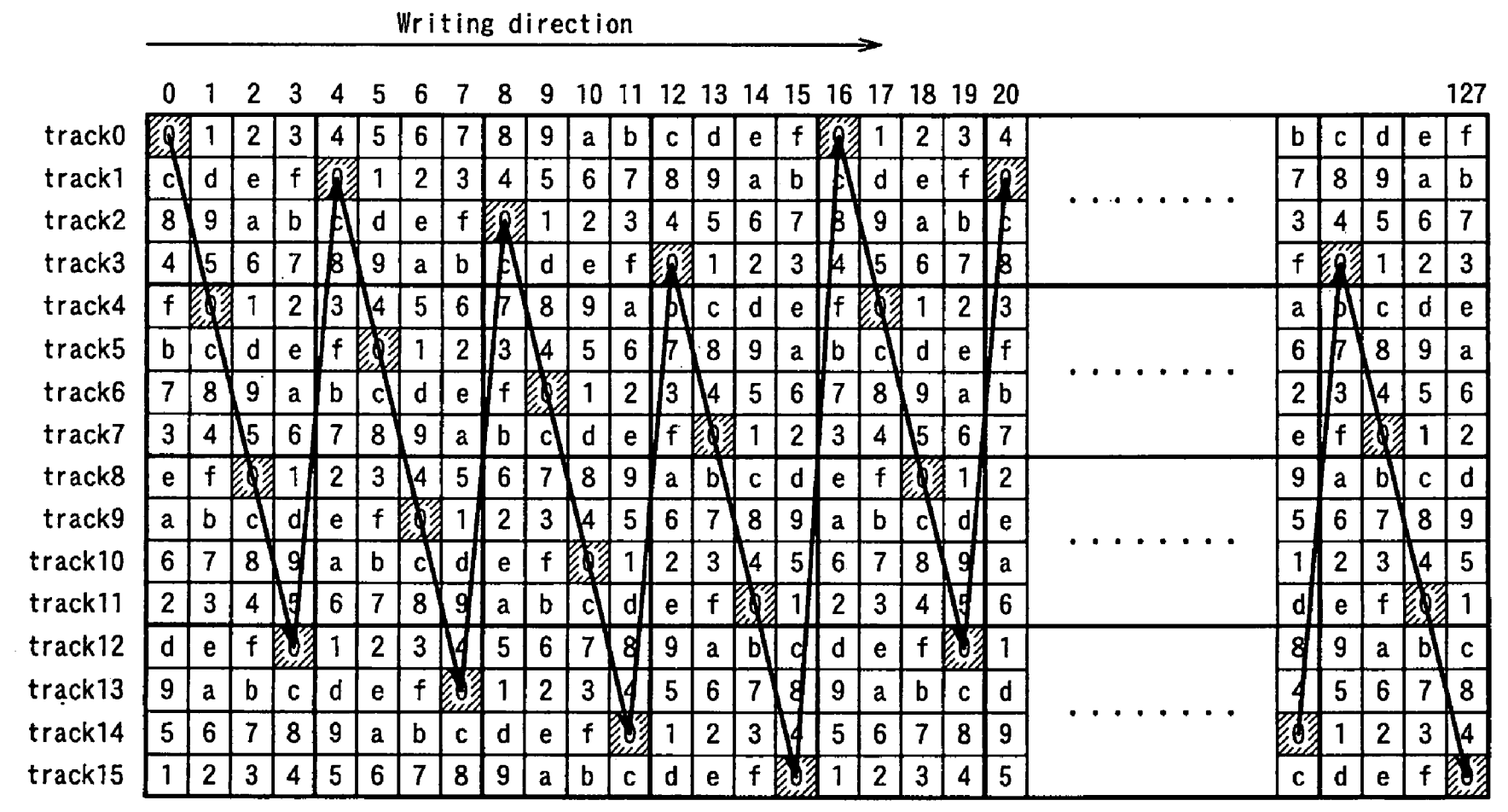

FIG. 21 is a schematic illustration of an exemplary arrangement of some of the data blocks belonging to the RS product code words on the recording tracks that are interleaved and coded according to an allocation matrix as shown in FIG. 10. In FIG. 21, a partition corresponds to a C1 code word (data block) and the C1 code words that belong to a same product code word are denoted by a same symbol (one of symbols 0 through f). For example, the C1 code words that are hatched in FIG. 21 and belong to the 0-th RS product code word are arranged sequentially in the order as indicated by the arrow in FIG. 21. FIG. 22 is a schematic illustration of the arrangement of part of the data blocks (C1 code words) on the recording tracks in FIG. 22, with numbers indicating the order of arrangement of C1 information words on a buffer.

Generally, when dividing input data by using product code information words and recording a plurality of product code words formed by adding parities to the product code information words as in the case of this embodiment and if the number of the error-correcting code belonging to one of the data blocks (C1 code words) is i and the data block number in the code word is j, the track number y where the data block is recorded and the position x as viewed from the leading end in the writing direction in the unit of data block can be drawn out by the formulas (5) and (6) below.

$$x=\lfloor (i \cdot C2\_frames)/N \rfloor + \lfloor j/N \rfloor \qquad (5)$$

$$y=\lfloor \{(C1\_blocks+i-j) \bmod N\}/a \rfloor + \{(C1\_blocks+i-j) \bmod N\} \qquad (6)$$

where ⌊ ⌋ indicates an (floor) operation with cut off decimals.

In the above expressions, variable C2_frames and variable C1_blocks indicate respectively the number of product code words that are recorded at the same time and the number of C1 code words in a product code word, while N indicates the number of tracks to be used for recording. In this embodiment of the invention, C2_frames=16, C1_blocks=128, N=16 and a=b=4.

Figure 23:
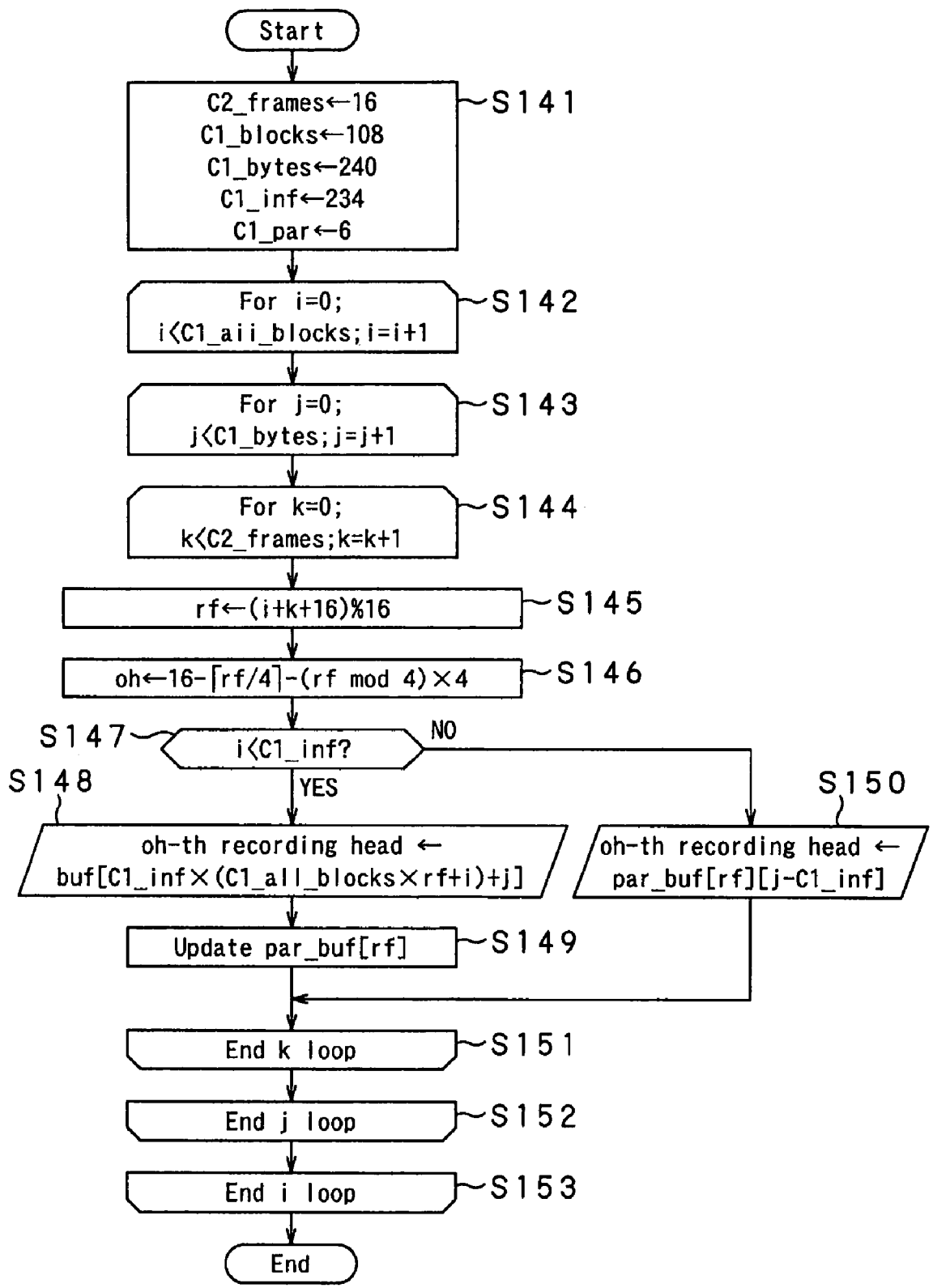
FIG. 23 is a flow chart of an exemplary processing operation of interleaving and adding C1 parities of the coding section.

The sequence of reading the data from the buffers 31, 35 shown in FIG. 13 and the numbers of the recording tracks (channels) where the byte data of the coded product code words can be determined by the method illustrated in the flow chart of FIG. 23. This operation corresponds to the process of Step S103 in FIG. 7. In other words, the flow chart of FIG. 23 shows the specific algorithm that is used in Step S103.

Referring now to FIG. 23, variable C2_frames and variable C1_all_blocks indicate respectively the number of product code words to be recorded and the number of C1 code words in a product code word, while variable C1_bytes and variable C1_inf indicate respectively the C1 code word length and the C1 information word length and variable C1_par indicates the number of C1 parities. The parameters (the variables C2_frames, C1_all_blocks, C1_bytes, C1_inf and C1_par) are set (initialized) in Step S141. Of the for loop from Step S142 to Step S153, the processing operations from Step S143 to S152 are repeated so long as the conditions of Step S142 are satisfied, incrementing the loop variable i. Of the for loop from Step S143 to Step S152, the processing operations from Step S144 to Step S151 are repeated so long as the conditions of Step S143 are satisfied, incrementing the loop variable j. Of the for loop from Step S144 to Step S151, the processing operations from Step S145 to Step S149 or S150 are repeated so long as the conditions of Step S144 are satisfied, incrementing the loop variable k. In Step S145, the number of the RS product code to be read is set to variable rf. In Step S146, the write track number (recording head number) is set to variable oh. In Step S147, if a C1 information word is output or a C1 parity data is output is selected. When a data (a C1 information word) is selected and output from the buffer 31 of FIG. 13, the processing operation proceeds to Step S148. The variable buf in Step S148 represents a one-dimensional memory. When a C1 parity data is selected and output, the processing operation proceeds to Step S150 and the data (C1 parity) of the C1 parity buffer 35 of FIG. 13 is read out. The variable par_buff[i][j] in Step S150 indicates the register that stores the j-th parity of the i-th RS product code word.

Figure 24:
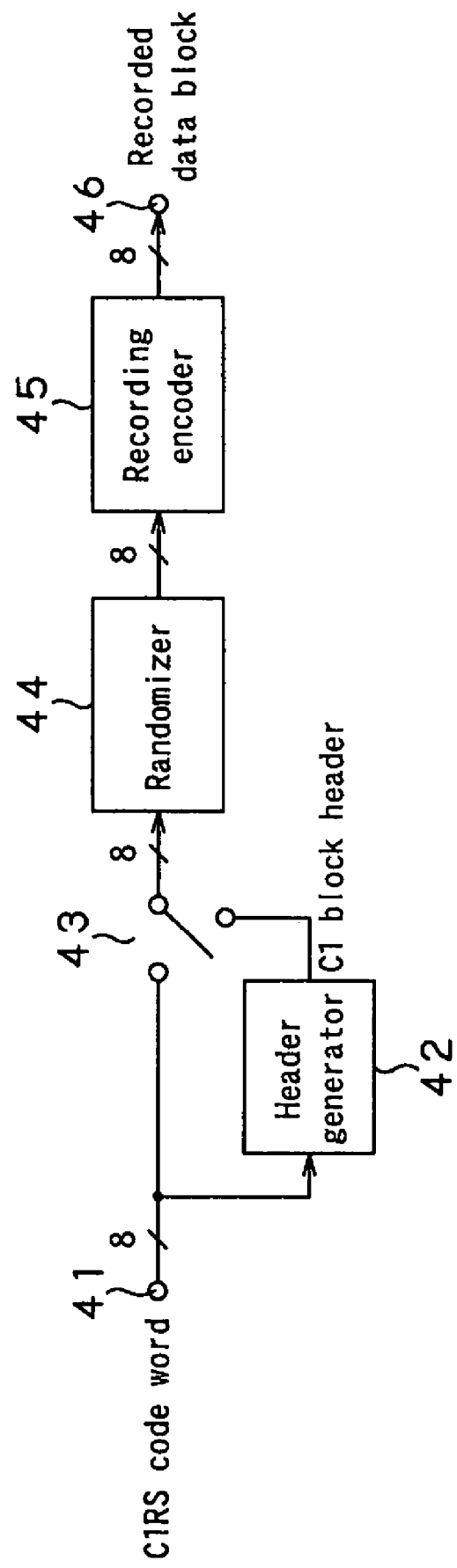
FIG. 24 is a schematic block diagram of a recording-coding section for recording coded data on a recording medium.

The data output from the coding section 12 having a configuration as shown in FIG. 13 are transmitted to the recording section (recording/reproduction section 13 in FIG. 8). Then, headers are added to the data by recording-coding section shown in the block diagram of FIG. 24. Thereafter, the data are randomized, recording-coded and recorded on a recording medium by means of recording heads. Referring to FIG. 24, the data input from the coding section by way of terminal 41 are sent to header generator section 42 and switch section 43, where the headers generated by the header generator section 42 are added to the input data, and then to randomizer 44, where the input data are randomized. Then, the data are sent to recording-encoder 45, where they are subjected to a recording-coding process such as modulation. Thereafter, they are taken out from terminal 46, sent to the channels of the recording heads (which may typically be those of the multi-head section 22 of FIG. 9) and recorded on a plurality of (e.g., 16) recording tracks in parallel of a recording medium.

Thus, with the above-described embodiment, when numbers from 0 through N−1 that represent error-correcting code words that are different from each other are arranged by using N same numbers to form an N×N (e.g., 16×16) square to make it operate as allocation matrix, any region having a size of (M−1)×M or M×(M−1) (a size of 3×4 or 4×3 for example) is constituted by numbers all of which are different from each other, if N is a natural number other than a prime number and a is a measure of N but not equal to 1, while the characteristic of a Latin square that a same number does not appear twice or more than twice on each row and each column. Then, by combining interleaving and error-correcting codes, using the above arrangement, it is possible to provide error-correcting capabilities that are as good as those of comparable conventional method relative to linear burst errors and better than them for burst errors that spread two-dimensionally.

While the $M^2 \times M^2$ size square that operates as allocation matrix in this embodiment is described above in terms of M=4 (16×16 size), the present invention is by no means limited thereto. In other words, M can be any integer not smaller than 2 and hence can be 2, 3, 5, . . . or some other integer. An allocation matrix as shown in FIG. 25 may be used when M=2 or the matrix has a 4×4 size. Similarly, an allocation matrix as shown in FIG. 26 may be used when M=3 or the matrix has a size of 9×9. Likewise, an allocation matrix as shown in FIG. 27 may be used when M=5 or the matrix has a size of 25×25. However, it should be noted that, when M=2, the error correction capabilities for burst errors that spread two-dimensionally of the embodiment are same as those of a perfect Latin square as described in Non-Patent Document 1.

While the technique of Non-Patent Document 1 that utilizes the arrangement or a perfect Latin square can only be applied to squares that are expressed by $M^2 \times M^2$ when M is a natural number larger than 2, the method of this embodiment can apply to any square that is expressed by N×N so long as N is a natural number that is not a prime number.

Figures 28, 29:
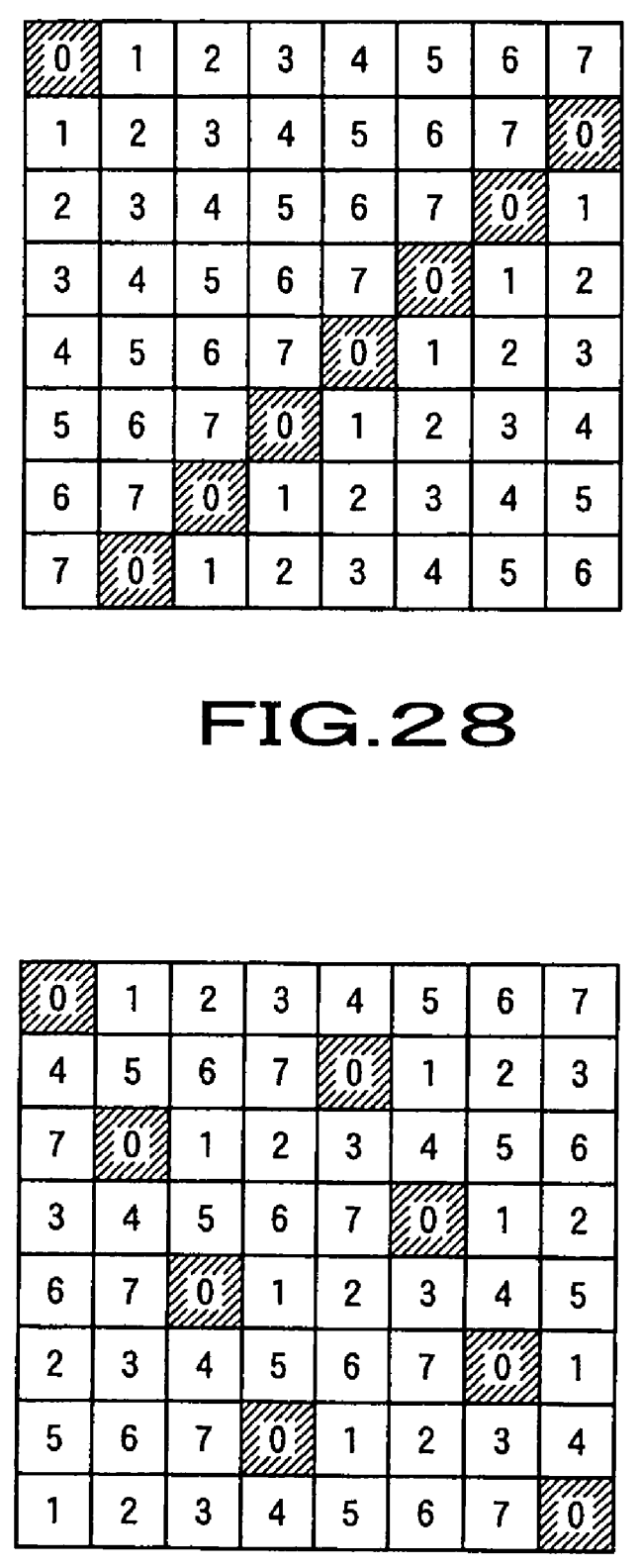

FIG. 28 is a schematic illustration of an 8×8 size allocation matrix formed on the basis of a Latin square according to Patent Document 1 and shown for the purpose of comparison when perfect Latin squares according to the Non-Patent Document 1 cannot be used and FIG. 29 is a schematic illustration of an allocation matrix that can be used for an embodiment of the present invention when N=8, a=4 and b=2. Table 2 below shows the maximum numbers of error events that can be corrected under guarantee when allocation matrixes of FIGS. 28 and 29 are used.

TABLE 2

| method | i × j | | | |
| --- | --- | --- | --- | --- |
|  | 1 × 1 | 2 × 2 | 3 × 2 | 3 × 3 |
| A | $d_2 - 1$ | $(d_2 - 1)/2$ | $(d_2 - 1)/2$ | $(d_2 - 1)/3$ |
| B | $d_2 - 1$ | $d_2 - 1$ | $d_2 - 1$ | $(d_2 - 1)/2$ |

Like Table 1 that is described earlier, Table 2 shows the maximum numbers of error events that can be corrected under guarantee for each error event when N=8 and $d_2$ represents the minimum distance of $d_2$. In Table 2, A shows some of the capabilities of the technique described in Patent Document 1 as illustrated in FIG. 28 and B shows the corresponding capabilities of the technique of this embodiment as illustrated in FIG. 29. It will be clear from Table 2 that the technique of this embodiment can correct burst errors more efficiently than the technique of Patent Document 1 when N=8.

Figure 30:
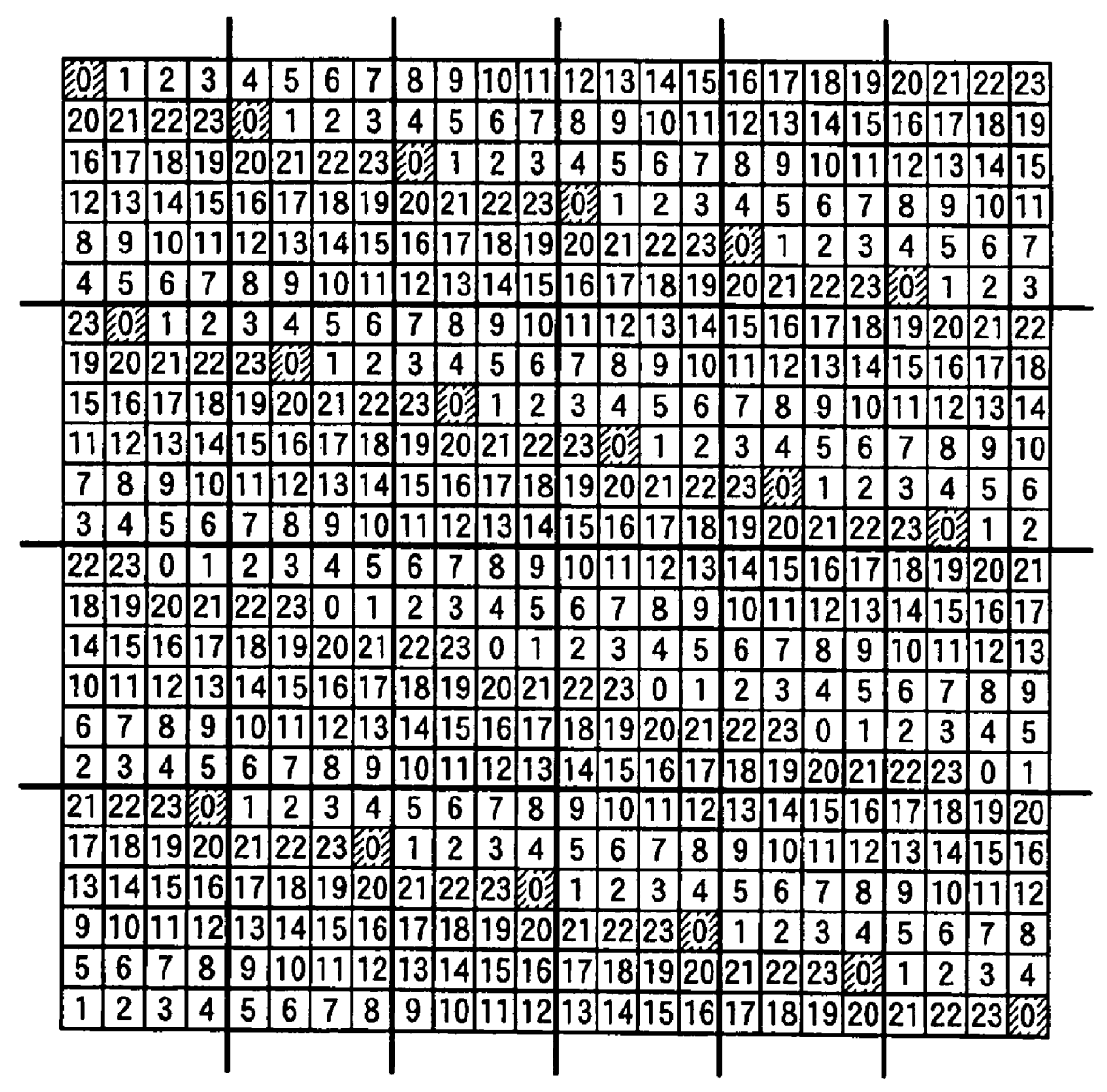

FIG. 30 is a schematic illustration of an allocation matrix that can be used for another embodiment of the present invention, when N=24, a=4 and b=6. FIG. 30 shows how 24 different error-correcting code words (product code words) are allocated to 24 channels when they are numbered by 0 through 23. In FIG. 30, the data blocks (C1 code words) that belong to the first (0-th) error-correcting code word (product code word) are arranged in the hatched partitions.

Figure 31:
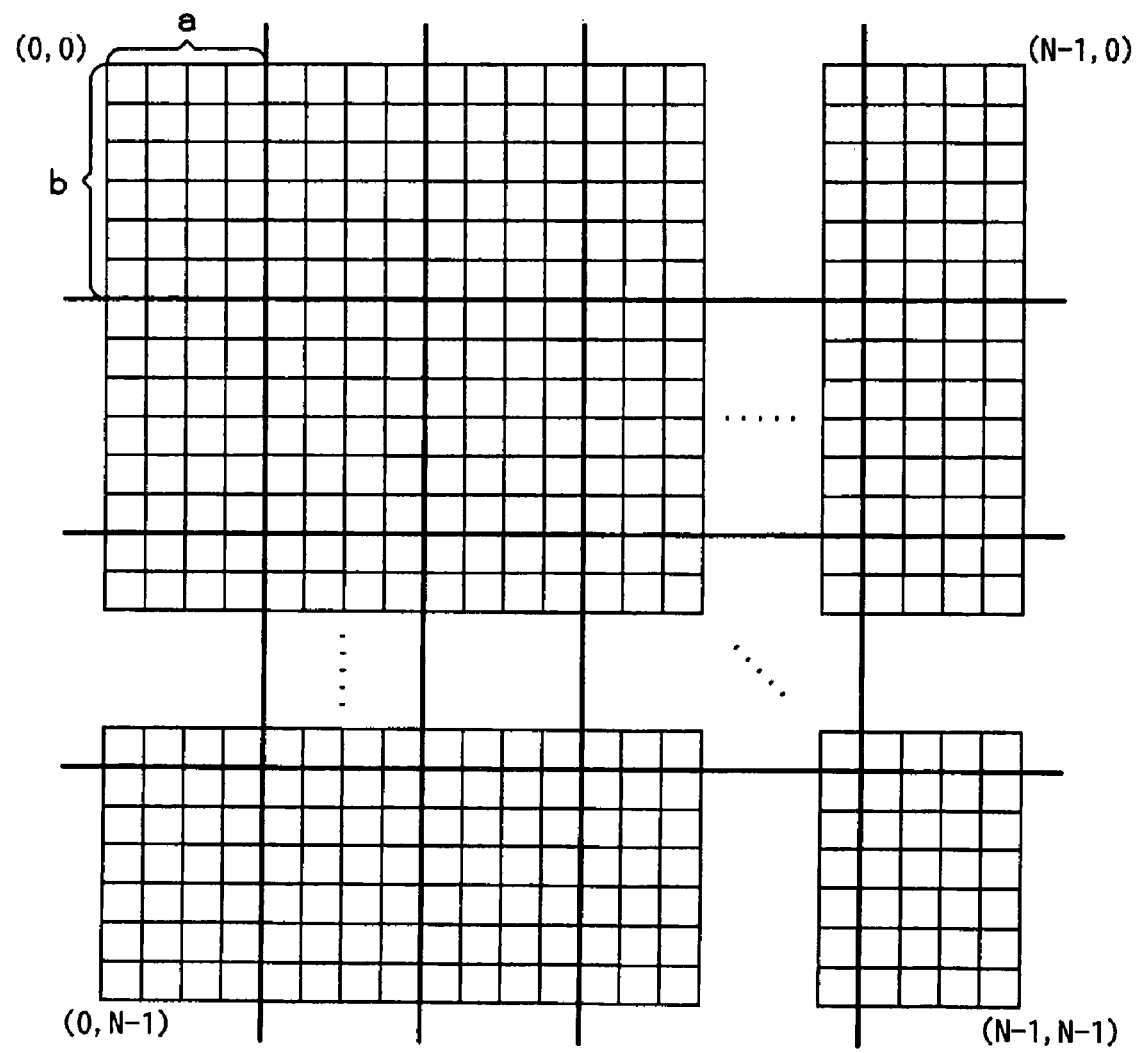
FIG. 31 is a schematic illustration of rules that are applicable when a square expressed by N×N is used as allocation matrix.
Figure 32:
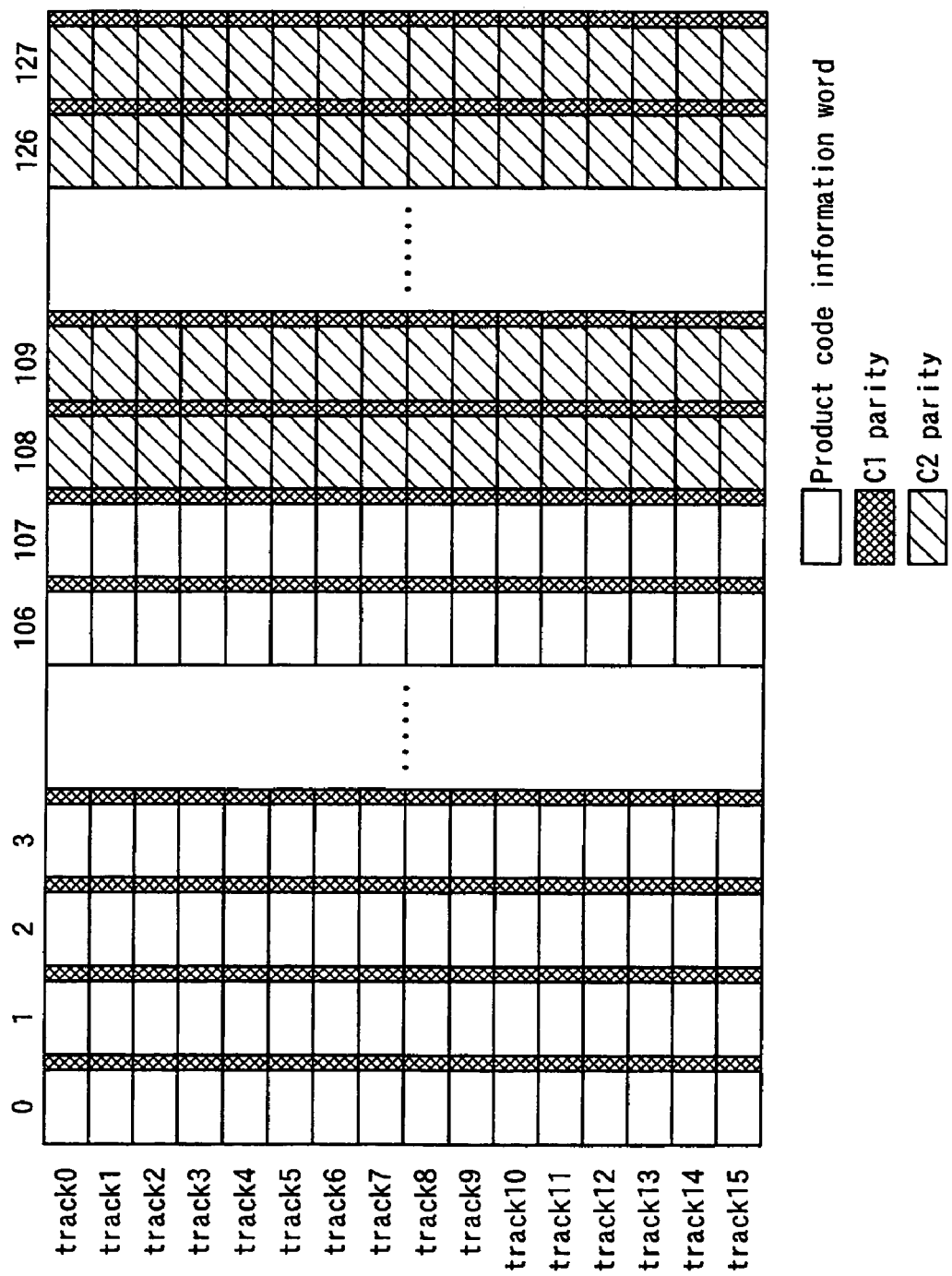
FIG. 32 is a schematic illustration of the relationship between product code information words and C1 parities and C2 parities in a two-dimensional data arrangement when data are arranged on a plurality of recording tracks.

The rules that are generally applicable when arranging N data blocks (C1 code words) that belong to N different error-correcting code words in a square expressed by N×N, where N is a natural number that is not a prime number, will be described below. Firstly, the region of N×N is divided into a plurality of sub-regions having a width of a and a length of b, where a is a measure of N but not equal to 1 and b is defined by a×b=N. Referring to FIG. 31, when a total of b a×b subregions are arranged longitudinally and a total of a a×b subregions are arranged transversally, while the coordinates of the upper left C1 code word are (0, 0), the coordinates of the lower right C1 code word are (N−1, N−1) and k-th C2 code word that belong to the C1 code word expressed by (i, j) is expressed by formula (7) below.

[formula 6]

$$k = (2 \times N + i - a \times (j \bmod b) - \lfloor j/b \rfloor) \bmod Ntm \quad (7)$$

When an N×N size allocation matrix shows the arrangement of data when N data blocks are allocated to each of N channels, where N is expressed by two or more than two integers a, b (N=a×b), of a data blocks arranged consecutively in the direction of data arrangement in channels, the a data blocks of one of two adjacent regions located side by side in the direction of data arrangement in channels, each region having a size of a×b so as to occupy b channels arranged consecutively in the channel arranging direction and operating as unit, and belonging to a same error-correcting code word in the region are arranged at positions cyclically shifted by a channel relative to any data blocks in the other region in the b channels, while the data blocks of one of two adjacent regions located side by side in the channel arrangement direction and belonging to a same error-correcting code word in the region are arranged at positions cyclically shifted by a channel relative to any data blocks in the other region in the a data blocks.

For example, it is possible to obtain an allocation matrix shown in FIG. 30, where N=24, a=4 and b=6 and the direction of data arrangement in the channels are transversal while the channel arrangement direction is longitudinal when 4 data blocks of one of two adjacent regions located side by side in the direction of data arrangement in the channels, each region having a size of 4×6 so as to occupy 6 channels arranged consecutively in the channel arranging direction and operating as unit, and belonging to a same error-correcting code word in the region are arranged at positions cyclically shifted by a channel relative to any data blocks in the other region in the 6 channels, while the data blocks of one of two adjacent 4×6 size regions located side by side in the channel arrangement direction and belonging to a same error-correcting code word in the region are arranged at positions cyclically shifted by a channel relative to any data blocks in the other region in the 4 data blocks.

It may be clear from the above description that, when data blocks are arranged to form an N×N size square as allocation matrix, the user of a square of the above described embodiment can correct errors more efficiently than that of a square formed by using the technique of Patent Document 1 if N is a natural number other than a prime number and than that of a square formed by using the technique of Non-Patent Document 1 if N is a natural number other than a prime number and not smaller than 6.

The interleaving technique of the present invention can be applied not only to the user of product codes of the second degree as in the case of the above described embodiment but also to other codes such as codes of the first degree or product codes of the third or a higher degree.

Meanwhile, the coding section of the above described embodiment has a buffer for storing product code information words and C2 parities as shown in FIG. 13 because the input data are divided sequentially from the leading byte so as to be allocated to the regions, the number of which corresponds to the number of different product code information words, and the obtained product code words are interleaved and recorded. However, for the purpose of the present invention, input data may alternatively be recorded in the regions, the number of which corresponds to the number of different product code information words, in order to arrange data two-dimensionally and the information words of each type may be sorted in each region and C2 parities may be added to them, using a square according to the invention. In other words, a buffer for storing product code information words and C2 parities are not necessarily required for the purpose of the present invention.

Figure 33:
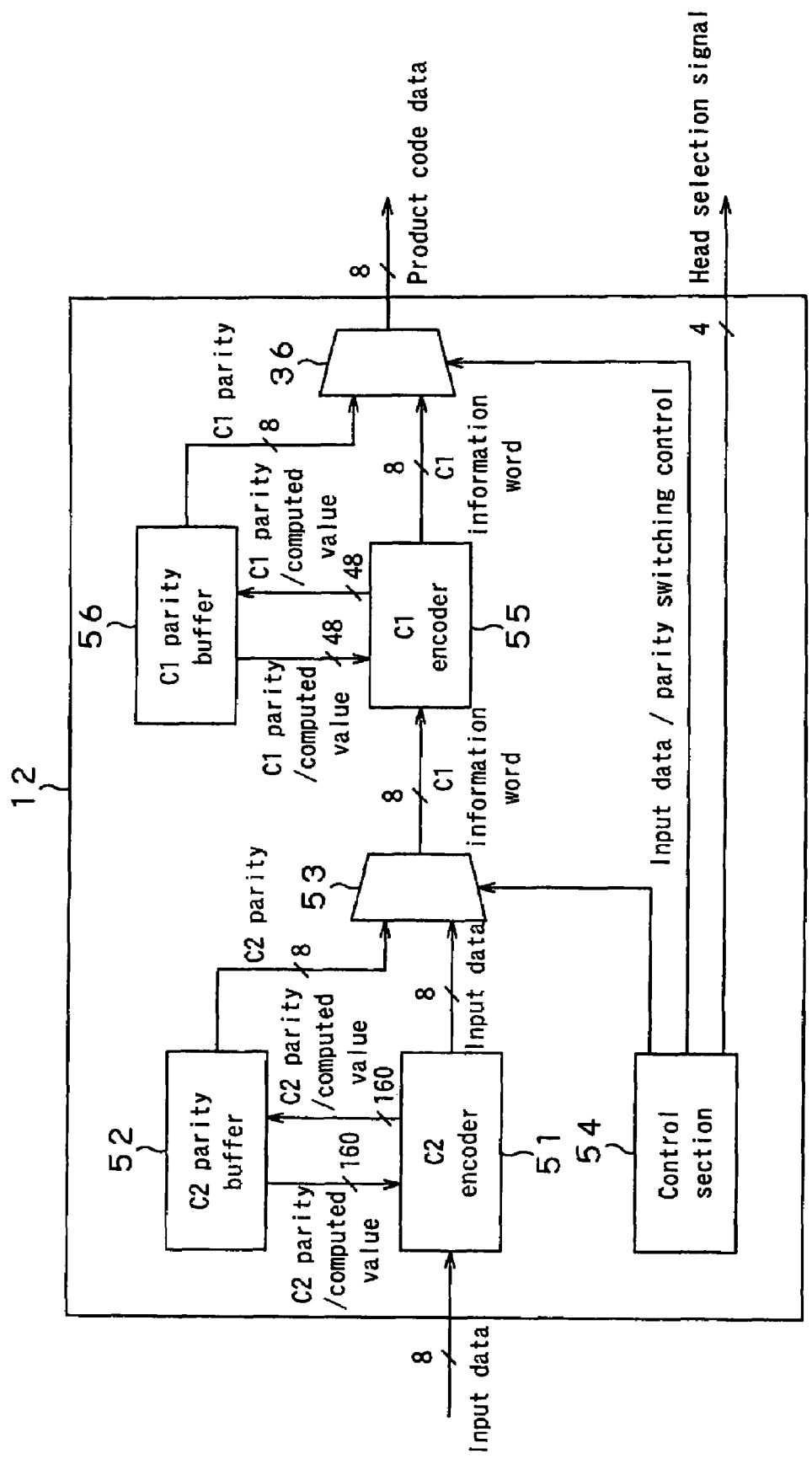
FIG. 33 is a schematic block diagram of the coding section, showing another possible configuration.

For example, an arrangement that does not use a buffer for storing product code information words and C2 parities as shown in FIG. 33 may be used in place of the arrangement of the coding section as shown in FIG. 13 that is used in the above described embodiment.

The arrangement of FIG. 33 can also be used for the coding section 12 of FIG. 8. Now, referring to FIG. 33, the input data (information words) from the input terminal 11 are sent to the C2 encoder 51. In the coding section 12 of FIG. 33, RS (240, 234, 7) codes on GF ($2^8$) are used as C1 codes and RS (128, 108, 21) codes on GF ($2^8$) are used as C2 codes so that 16 RS product code words are allocated to 16 channels and recorded or transmitted.

Figure 34:
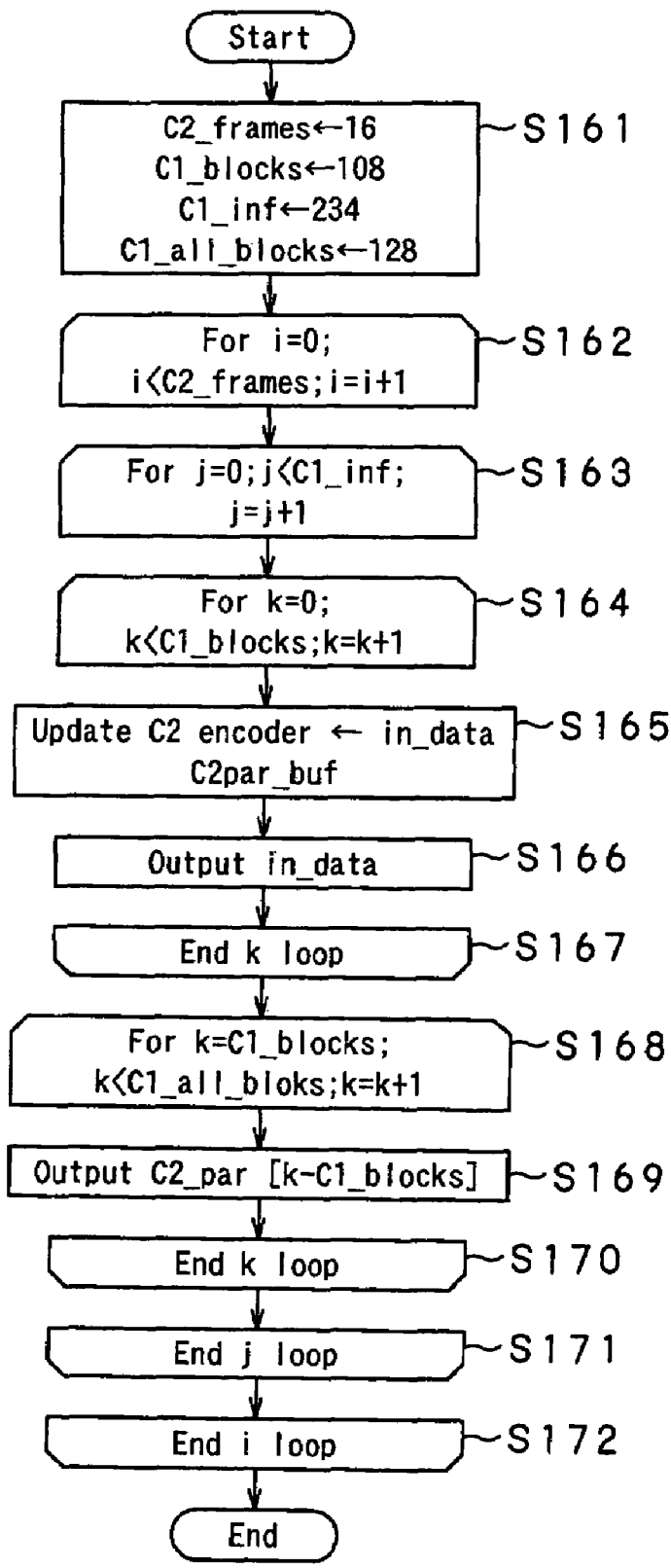
FIG. 34 is a flow chart of the processing operation of adding C2 parities of the coding section of FIG. 33.

The input data from the input terminal 11 are sequentially sent to the C2 encoder 51 of FIG. 33 on a byte by byte basis and the C2 parity (20 bytes=160 bits), which belongs to the C2 code word same as the input data and the value of which is being computed, is read out from the C2 parity buffer 52 and the parity value is updated by the input data of 1 byte. Then, the updated parity value is written to the C2 parity buffer 52. Then, the input data (C1 information words) from the C2 encoder 51 and the C2 parities from the C2 parity buffer 52 are sent to the multiplexer (or switch) 53 on a byte by byte basis. The multiplexer 53 is controlled for its switching operation by the control section 54. FIG. 34 is a flow chart of the processing operation of interleaving and adding C2 parities of the coding section of FIG. 33.

Referring now to FIG. 34, variable C2_frames indicates the number of product code words and variable C1_blocks indicates the number of C1 code words contained in a product code word, while variable C1_inf indicates the C1 information word length and variable C1_all_blocks indicates the total number of C1 code words contained in the product code words. In Step S161, in FIG. 34, the variables C2_frames, C1_blocks, C1_inf and C1_all_blocks store their respective initial values. Note that, in Step S169, C2_par [x] indicates the parity of the x-th byte. Of the for loop from Step S162 to Step S172, the processing operations from Step S163 to Step S171 are repeated so long as the conditions of Step S172 are satisfied, incrementing the loop variable i. Of the for loop from Step S163 to S171, the processing operations from Step S164 to Step S170 are repeated so long as the conditions of Step S163 are satisfied, incrementing the loop variable j. Of the for loop from Step S164 to Step S167, the processing operations of Steps S165 and S166 are repeated so long as the conditions of Step S164 are satisfied, incrementing the loop variable k. Finally, of the for loop from Step S168 to Step S170, the processing of Step S169 is repeated so long as the conditions of Step S168 are satisfied, incrementing the loop variable k.

Figure 35:
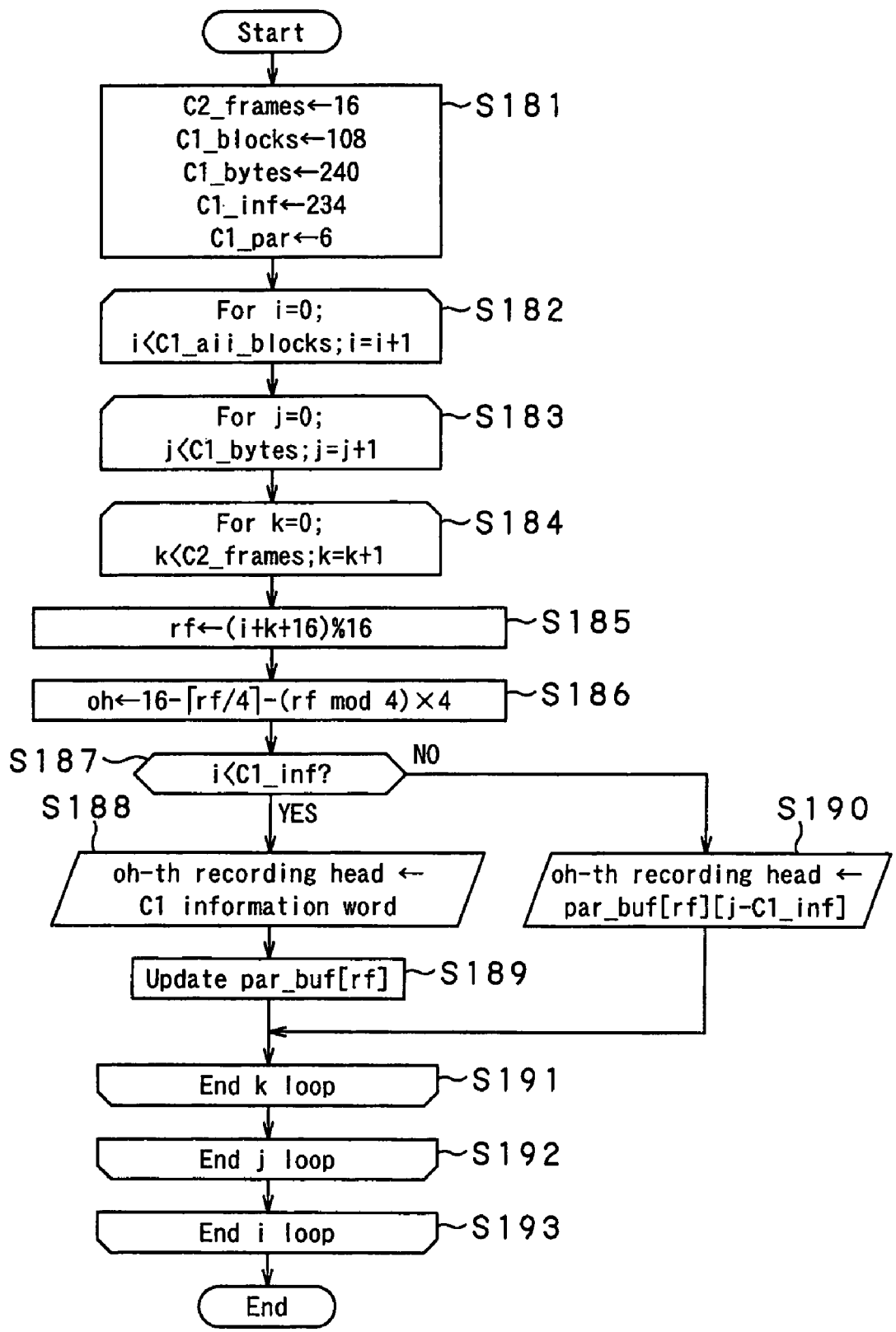
FIG. 35 is a flow chart of an exemplary processing operation of interleaving and adding C1 parities of the coding section of FIG. 33.

As a result of the above process, the C1 information words output from the multiplexer 53 on a byte by byte basis are sent to the C1 encoder 55. The C1 encoder 55 computes the C1 parities for the input data and stores them in the C1 parity buffer 56. Then, the data (C1 information words) from the C1 encoder 55 and the C1 parities from the C1 parity buffer 56 are sent to the multiplexer 57 to produce C1 code words. The multiplexer 57 is controlled for its switching operation by the control section 54 and the output from the multiplexer 57 is sent to the recording/reproduction section 13 of FIG. 8 as the output of the coding section 12. FIG. 35 is a flow chart of an exemplary processing operation of interleaving and adding C1 parities of the coding section of FIG. 33.

Referring to FIG. 35, variable C2_frames indicates the number of product code words to be recorded and variable C1_all_blocks indicates the number of C1 code words contained in a product code word, while variable C1bytes and C1_inf respectively indicate the C1 code word length and the C1 information word length and variable C1_par indicates the number of C1 parities. In Step S181, the parameters of RS codes (the variables C2_frames, C1_all_blocks, C1_bytes, C1_inf and C1_par) are set to their respective initial values. Of the for loop from Step S182 to Step S193, the processing operations from Step S183 to Step S192 are repeated so long as the conditions of Step S182 are satisfied, incrementing the loop variable i. Of the for loop from Step S183 to S192, the processing operations from Step S184 to Step S191 are repeated so long as the conditions of Step S183 are satisfied, incrementing the loop variable j. Of the for loop from Step S184 to Step S191, the processing operations from Step S185 to S189 or S190 are repeated so long as the conditions of Step S184 are satisfied, incrementing the loop variable k. In Step S185, the number of the RS product code to be read is set to variable rf. In Step S186, the write track number (recording head number) is set to variable oh. In Step S187, if a C1 information word is output or a C1 parity data is output is selected. When a C1 information word is selected and output, the processing operation proceeds to Step S188 and the C1 information word is sent to the oh-th recording head. When a C1 parity data is selected and output, the processing operation proceeds to Step S190 and the data (C1 parity) from the C1 parity buffer 56 of FIG. 33 is read out so that the C1 parity is sent to the oh-th recording head.

A buffer of 479,232 bytes is required when a coding section is used as shown in FIG. 13, whereas a C2 parity buffer is required to have a capacity of 74,880 bytes when the arrangement of FIG. 33 is employed.

The present invention is by no means limited to the above described embodiments, which may be modified and/or altered in various different ways without departing from the scope of the invention.

In should be understood by those skilled in the art that various modifications, combinations, sub-combinations and alterations may occur depending on design requirements and other factors insofar as they are within the scope of the appended claims or the equivalents thereof.

What is claimed is:

1. A data processing method for coding digital data by means of error-correcting codes and allocating them to a plurality of channels, using data blocks of a predetermined length as units, the method comprising:

initially allocating coded data to N channels, the data being arranged consecutively in the channels wherein different error correcting code words include coded data from each of the N channels; and thereafter rearranging the coded data into blocks of data such that a−1 data blocks arranged consecutively in a channel are from channels or where a data blocks consecutively arranged in a channel are from b−1 channels and are from different error-correcting code words, where N is the number of the channels (N=a×b, where both a and b are integers not smaller than 2).

2. The method according to claim 1, wherein the error-correcting codes are Reed-Solomon product codes and the data blocks are code words of one of the code series of the Reed-Solomon product codes.

3. The method according to claim 1, wherein the allocated coded data of N channels are recorded on N recording tracks arranged in parallel with each other on a recording medium.

4. The method according to claim 1, wherein the allocated data of N channels are transmitted by way of N parallel transmission channels.

5. The method according to claim 1, wherein the N is not smaller than six.

6. The method according to claim 5, wherein the N is 8, 9, 16 or 24.

7. A data recording apparatus comprising:

coding means for initially coding digital data by means of error-correcting codes such that each error correcting code word includes data from each of a plurality of data channels, rearranging the obtained coded data into data blocks and allocating the data blocks to a plurality of recording tracks; and recording means for recording the coded data from the coding means on the plurality of recording tracks on the recording medium;

the coding means allocating the coded data to tracks so as to make N data blocks arranged continuously in the direction of data arrangement in tracks or in a track arranging direction such that a−1 data blocks continuously arranged in a track are from b continuously arranged channels or where a data blocks continuously arranged in a track are from b−1 tracks and are from different error-correcting code words, where N being the number of the channels (N=a×b, where both a and b are integers not smaller than 2).

8. A data transmission apparatus comprising:

coding means for coding digital data by means of error-correcting codes, dividing the obtained coded data into data blocks of a predetermined length and allocating them to a plurality of channels, wherein each of the error correcting code words includes data from each of the channels; and transmission means for transmitting the coded data from the coding means by way of the plurality of channels; and further comprising means for allocating the coded data to N channels wherein N data blocks are arranged such that a−1 data blocks arranged consecutively in a channel are from in b consecutively arranged channels or where a data blocks consecutively arranged in a channel are from b−1 channels are from different error-correcting code words, where N is the number of the channels (N=a×b, where both a and b are integers not smaller than 2).

* * * * *